United States Patent
Yamada et al.

(10) Patent No.: US 11,645,795 B2
(45) Date of Patent: May 9, 2023

(54) APPARATUS, METHOD AND MEDIUM

(71) Applicant: CANON KABUSHIKI KAISHA, Tokyo (JP)

(72) Inventors: Takayuki Yamada, Kawasaki (JP); Shinjiro Hori, Yokohama (JP); Hiroyasu Kunieda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/787,272

(22) Filed: Feb. 11, 2020

(65) Prior Publication Data

US 2020/0279423 A1 Sep. 3, 2020

(30) Foreign Application Priority Data

Feb. 28, 2019 (JP) ............................. JP2019-036905

(51) Int. Cl.
*G06T 11/60* (2006.01)

(52) U.S. Cl.
CPC ..................... *G06T 11/60* (2013.01)

(58) Field of Classification Search
CPC ................. G06T 11/60; G06F 40/106
See application file for complete search history.

(56) References Cited

U.S. PATENT DOCUMENTS

| | | | |
|---|---|---|---|
| 8,325,398 B2 * | 12/2012 | Satomi | G11B 27/034 358/537 |
| 8,620,105 B2 | 12/2013 | Hori et al. | |
| 8,842,322 B2 * | 9/2014 | Satomi | G11B 27/034 358/1.15 |
| 9,052,742 B2 | 6/2015 | Hori et al. | |
| 9,189,681 B2 | 11/2015 | Kunieda et al. | |
| 9,214,027 B2 | 12/2015 | Sumi et al. | |
| 9,275,270 B2 | 3/2016 | Suwa et al. | |
| 9,594,534 B2 | 3/2017 | Sasaki et al. | |
| 9,704,221 B2 | 7/2017 | Hori et al. | |
| 9,769,352 B2 | 9/2017 | Yanai et al. | |
| 10,013,395 B2 | 7/2018 | Kajiwara et al. | |
| 10,043,300 B2 * | 8/2018 | Obayashi | G06T 11/60 |
| 10,275,652 B2 | 4/2019 | Yamamoto et al. | |
| 10,290,135 B2 | 5/2019 | Mizoguchi | G06K 9/00684 |
| 10,387,542 B2 * | 8/2019 | Ishida | G06F 3/0481 |
| 10,402,654 B2 * | 9/2019 | Goto | G06T 7/62 |

(Continued)

FOREIGN PATENT DOCUMENTS

JP 2016-066328 A 4/2016

*Primary Examiner* — Shen Shiau
(74) *Attorney, Agent, or Firm* — Venable LLP

(57) ABSTRACT

An object of the present disclosure is to create an album having both the contents common to all persons and the contents in accordance with each individual. One embodiment of the present disclosure is an apparatus that creates an album for each main object, which consists of a plurality of double-page spreads including a common double-page spread used in common in at least two albums and an individual double-page spread corresponding to the main object and has a calculation unit configured to calculate a candidate number of individual double-page spreads that is set for all the albums for each album and a determination unit configured to determine the minimum candidate among the candidates calculated by the calculation unit as the number of individual double-page spreads for all the albums.

7 Claims, 33 Drawing Sheets

(56) References Cited

U.S. PATENT DOCUMENTS

| | | | |
|---|---|---|---|
| 10,403,014 B2* | 9/2019 | Kunieda | G06T 1/0007 |
| 10,437,434 B2 | 10/2019 | Tomono et al. | |
| 10,460,494 B2* | 10/2019 | Kunieda | G06T 5/50 |
| 10,506,110 B2* | 12/2019 | Kunieda | H04N 1/00161 |
| 10,560,601 B2 | 2/2020 | Obayashi | G06K 9/00684 |
| 10,649,633 B2* | 5/2020 | Hori | G06T 11/60 |
| 10,708,446 B2* | 7/2020 | Kunieda | H04N 1/00137 |
| 10,740,641 B2* | 8/2020 | Iguchi | G06T 7/97 |
| 10,742,823 B2* | 8/2020 | Iguchi | G06K 9/00288 |
| 10,776,974 B2* | 9/2020 | Mitsumoto | G06K 9/00288 |
| 10,904,473 B2* | 1/2021 | Hayakawa | G06T 11/60 |
| 10,917,529 B2* | 2/2021 | Yamada | H04N 1/00161 |
| 10,943,376 B2* | 3/2021 | Kunieda | G06K 9/00684 |
| 10,958,796 B2* | 3/2021 | Obayashi | H04N 1/00167 |
| 10,977,302 B2* | 4/2021 | Hayakawa | G06F 16/50 |
| 10,977,845 B2* | 4/2021 | Obayashi | G06F 3/0481 |
| 10,992,827 B2* | 4/2021 | Ishida | G06F 3/0482 |
| 11,140,277 B2* | 10/2021 | Yamada | H04N 1/00456 |
| 2006/0053370 A1* | 3/2006 | Hitaka | H04N 1/3875 |
| | | | 715/251 |
| 2007/0146833 A1* | 6/2007 | Satomi | G11B 27/034 |
| | | | 358/537 |
| 2010/0164992 A1* | 7/2010 | Akiya | H04N 1/00456 |
| | | | 345/641 |
| 2011/0234613 A1* | 9/2011 | Hanson | G06F 16/58 |
| | | | 345/589 |
| 2012/0294514 A1* | 11/2012 | Saunders | G06K 9/00677 |
| | | | 382/159 |
| 2013/0057934 A1* | 3/2013 | Satomi | G11B 27/034 |
| | | | 358/537 |
| 2015/0189107 A1* | 7/2015 | Murata | H04N 1/3872 |
| | | | 345/629 |
| 2016/0092054 A1* | 3/2016 | Tomono | G06Q 10/101 |
| | | | 715/738 |
| 2017/0039670 A1* | 2/2017 | Obayashi | G06F 3/0481 |
| 2017/0039746 A1* | 2/2017 | Mizoguchi | G06T 11/60 |
| 2017/0039747 A1* | 2/2017 | Ishida | G06T 1/0007 |
| 2017/0039748 A1* | 2/2017 | Kunieda | G06T 11/60 |
| 2017/0185843 A1* | 6/2017 | Goto | G06T 7/20 |
| 2017/0186201 A1* | 6/2017 | Obayashi | H04N 1/00442 |
| 2017/0309011 A1 | 10/2017 | Hori et al. | |
| 2017/0316558 A1 | 11/2017 | Hori et al. | |
| 2018/0089873 A1* | 3/2018 | Tsukagoshi | G06K 9/00624 |
| 2018/0164964 A1* | 6/2018 | Hori | G06F 3/0483 |
| 2018/0164984 A1* | 6/2018 | Kunieda | G06F 9/451 |
| 2018/0165538 A1* | 6/2018 | Iguchi | G06T 7/136 |
| 2018/0165856 A1* | 6/2018 | Kunieda | G06T 5/50 |
| 2018/0167521 A1* | 6/2018 | Iguchi | H04N 1/00196 |
| 2018/0167522 A1* | 6/2018 | Kunieda | G06K 9/628 |
| 2018/0167532 A1* | 6/2018 | Obayashi | G06T 11/60 |
| 2018/0217743 A1* | 8/2018 | Ishida | G06F 3/04847 |
| 2018/0218527 A1* | 8/2018 | Kunieda | G06K 9/00221 |
| 2018/0220098 A1* | 8/2018 | Hayakawa | G06T 11/60 |
| 2018/0268520 A1 | 9/2018 | Kunieda et al. | |
| 2018/0357806 A1* | 12/2018 | Ishida | G06T 11/60 |
| 2019/0005697 A1* | 1/2019 | Mitsumoto | G06K 9/00677 |
| 2019/0102060 A1* | 4/2019 | Ishida | G06F 3/0486 |
| 2019/0102926 A1* | 4/2019 | Obayashi | G06T 11/60 |
| 2019/0104222 A1* | 4/2019 | Kunieda | H04N 1/00196 |
| 2019/0325627 A1* | 10/2019 | Kunieda | G06T 11/60 |
| 2019/0327367 A1* | 10/2019 | Obayashi | G06F 9/3004 |
| 2020/0004774 A1* | 1/2020 | Hayakawa | G06F 16/50 |
| 2020/0233569 A1* | 7/2020 | Yamaji | G06F 3/0482 |
| 2020/0234076 A1* | 7/2020 | Katsumata | G06V 40/16 |
| 2020/0279422 A1* | 9/2020 | Yamada | G06T 11/60 |
| 2020/0279424 A1* | 9/2020 | Uratani | G06T 11/60 |
| 2020/0279425 A1* | 9/2020 | Yamada | G06T 7/0002 |
| 2020/0279426 A1* | 9/2020 | Yamada | G06V 20/30 |
| 2020/0279427 A1* | 9/2020 | Yamada | G06T 7/0002 |
| 2020/0280639 A1* | 9/2020 | Yamada | H04N 1/00161 |
| 2020/0280640 A1* | 9/2020 | Yamada | H04N 1/00196 |
| 2020/0302666 A1* | 9/2020 | Yamaji | H04N 1/387 |
| 2020/0336607 A1* | 10/2020 | Kunieda | G06F 16/5854 |
| 2020/0336608 A1* | 10/2020 | Kunieda | H04N 1/00196 |
| 2020/0388062 A1* | 12/2020 | Kunieda | G06T 7/0002 |
| 2020/0388063 A1* | 12/2020 | Kunieda | G06T 7/0002 |
| 2020/0389562 A1* | 12/2020 | Kunieda | H04N 1/00145 |
| 2020/0389566 A1* | 12/2020 | Kunieda | H04N 1/00167 |
| 2021/0042066 A1* | 2/2021 | Kitabatake | G06F 3/1253 |
| 2021/0042976 A1* | 2/2021 | Yamada | G06T 11/60 |
| 2022/0262054 A1* | 8/2022 | Takeichi | G06V 10/70 |
| 2022/0262055 A1* | 8/2022 | Takeichi | G06T 11/60 |
| 2022/0262056 A1* | 8/2022 | Takeichi | H04N 1/00196 |
| 2022/0262057 A1* | 8/2022 | Takeichi | G06T 11/60 |
| 2022/0263952 A1* | 8/2022 | Takeichi | G06F 3/04847 |
| 2022/0263953 A1* | 8/2022 | Takeichi | H04N 1/00169 |
| 2022/0263954 A1* | 8/2022 | Takeichi | H04N 1/00169 |

* cited by examiner

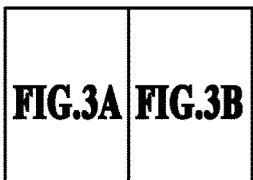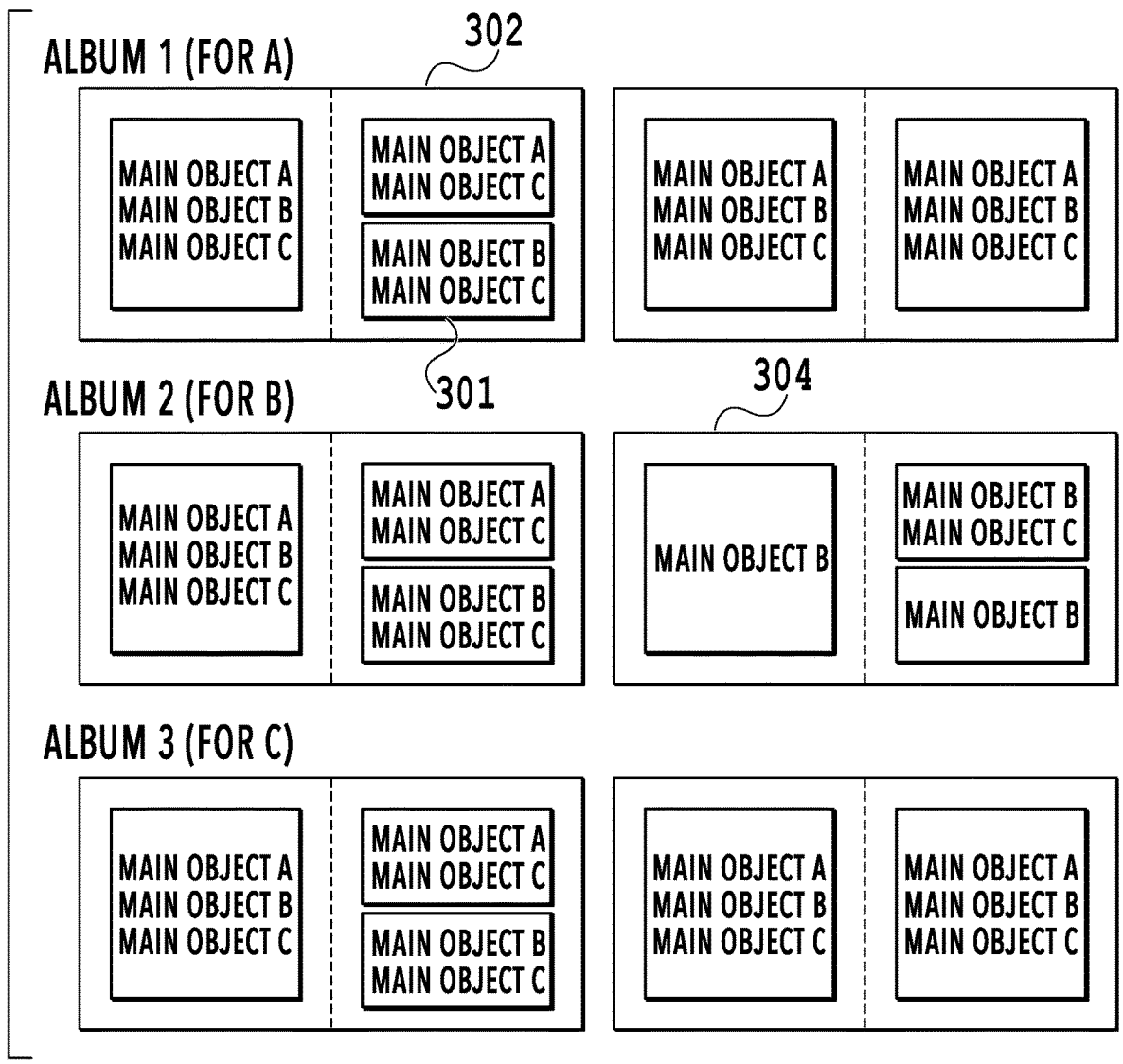
FIG.3A

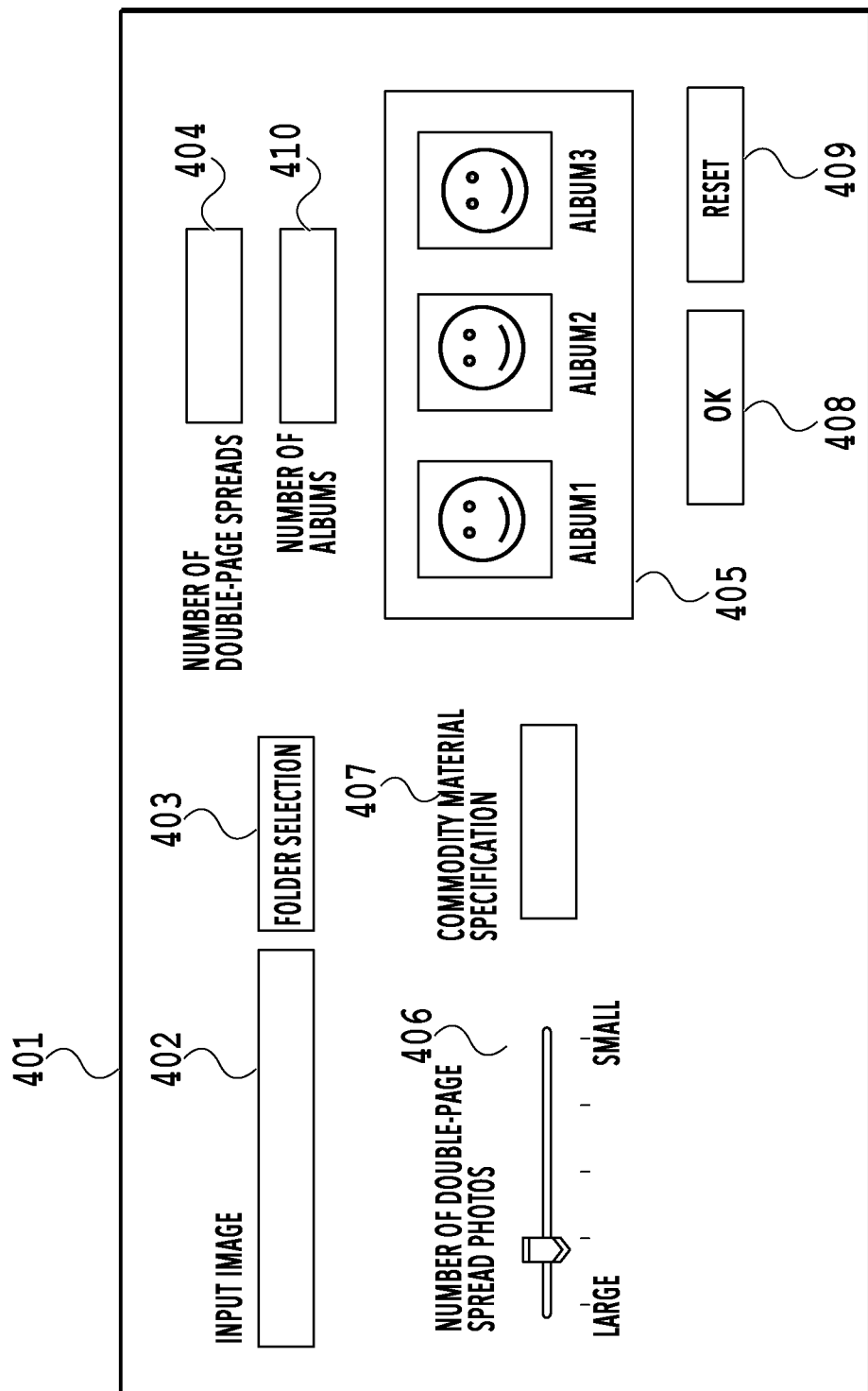

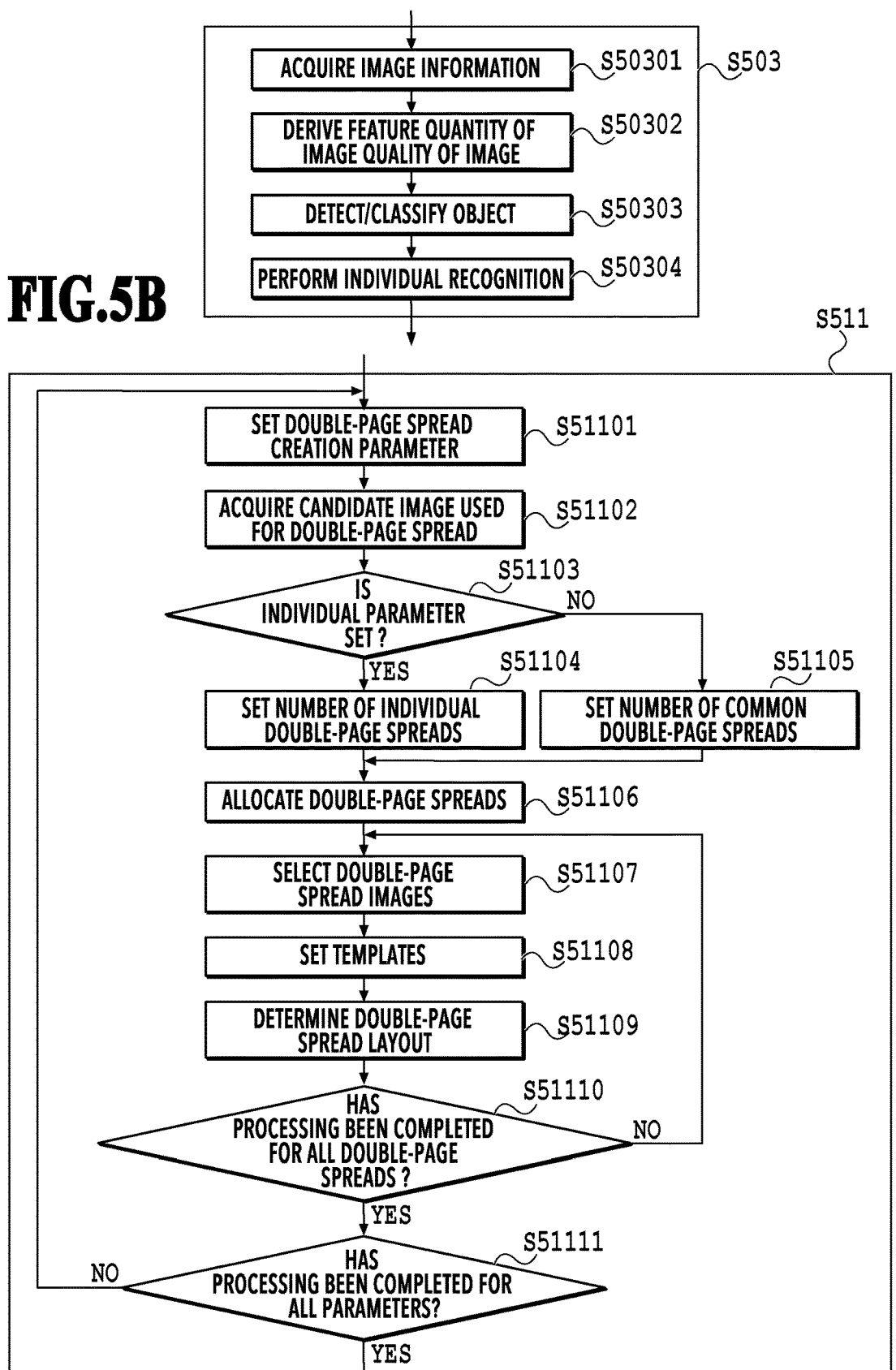

| SCENE | IMAGE CAPTURING PERIOD (TIME) | | NUMBER OF CAPTURED IMAGES | | NUMBER OF CAPTURED PERSONS | |
|---|---|---|---|---|---|---|
| | AVERAGE | STANDARD DEVIATION | AVERAGE | STANDARD DEVIATION | AVERAGE | STANDARD DEVIATION |
| JOURNEY | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.7

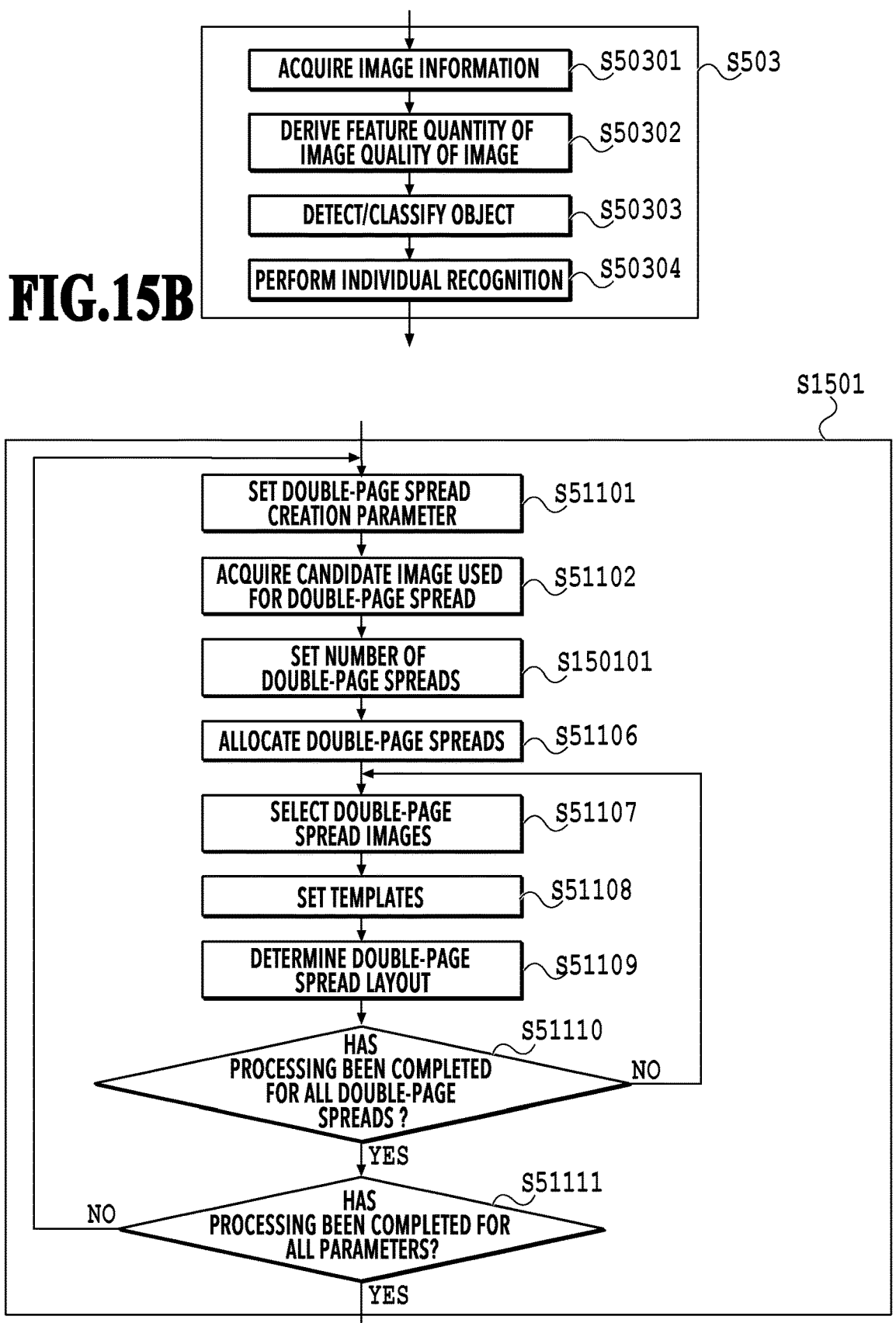

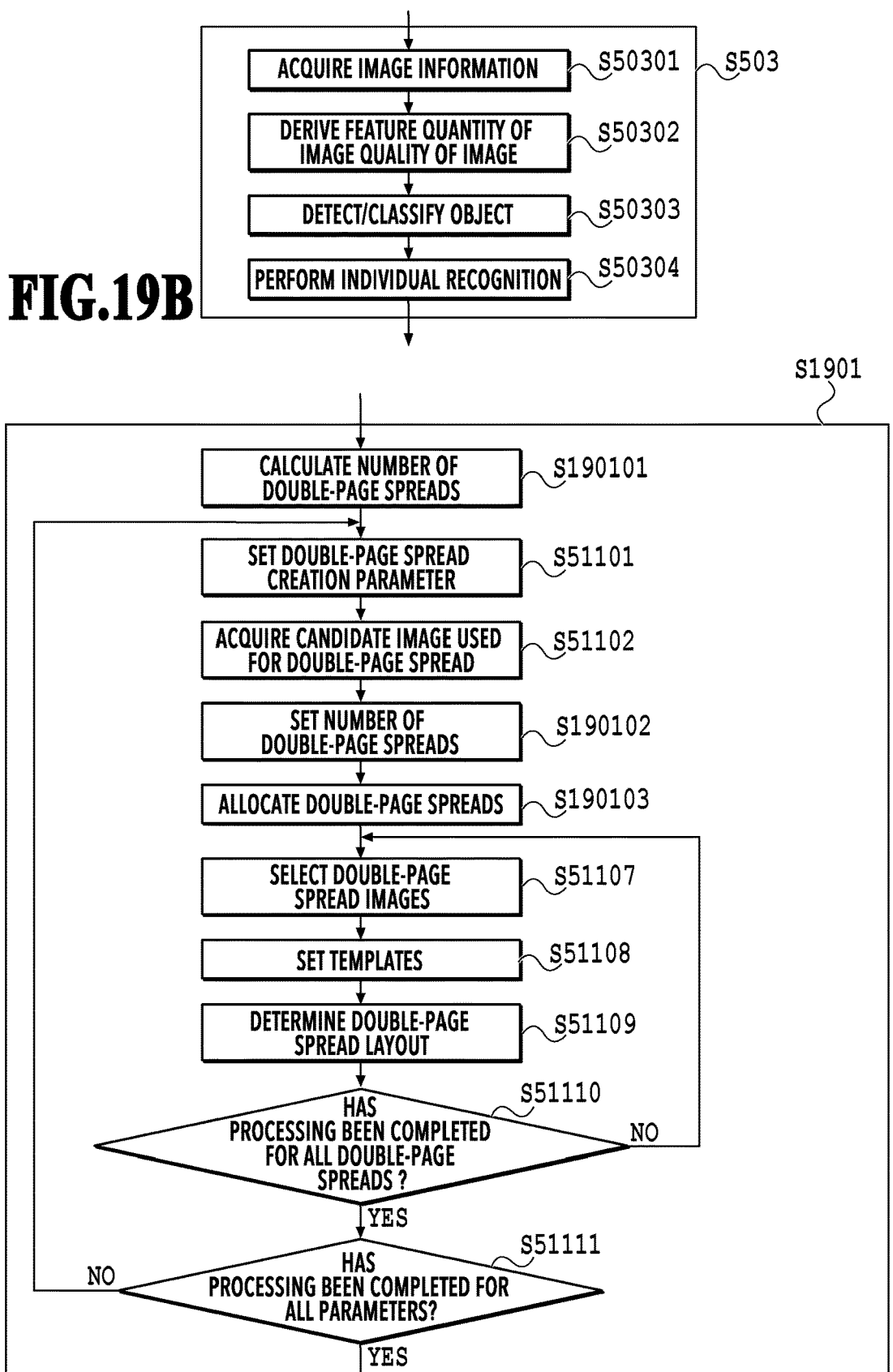

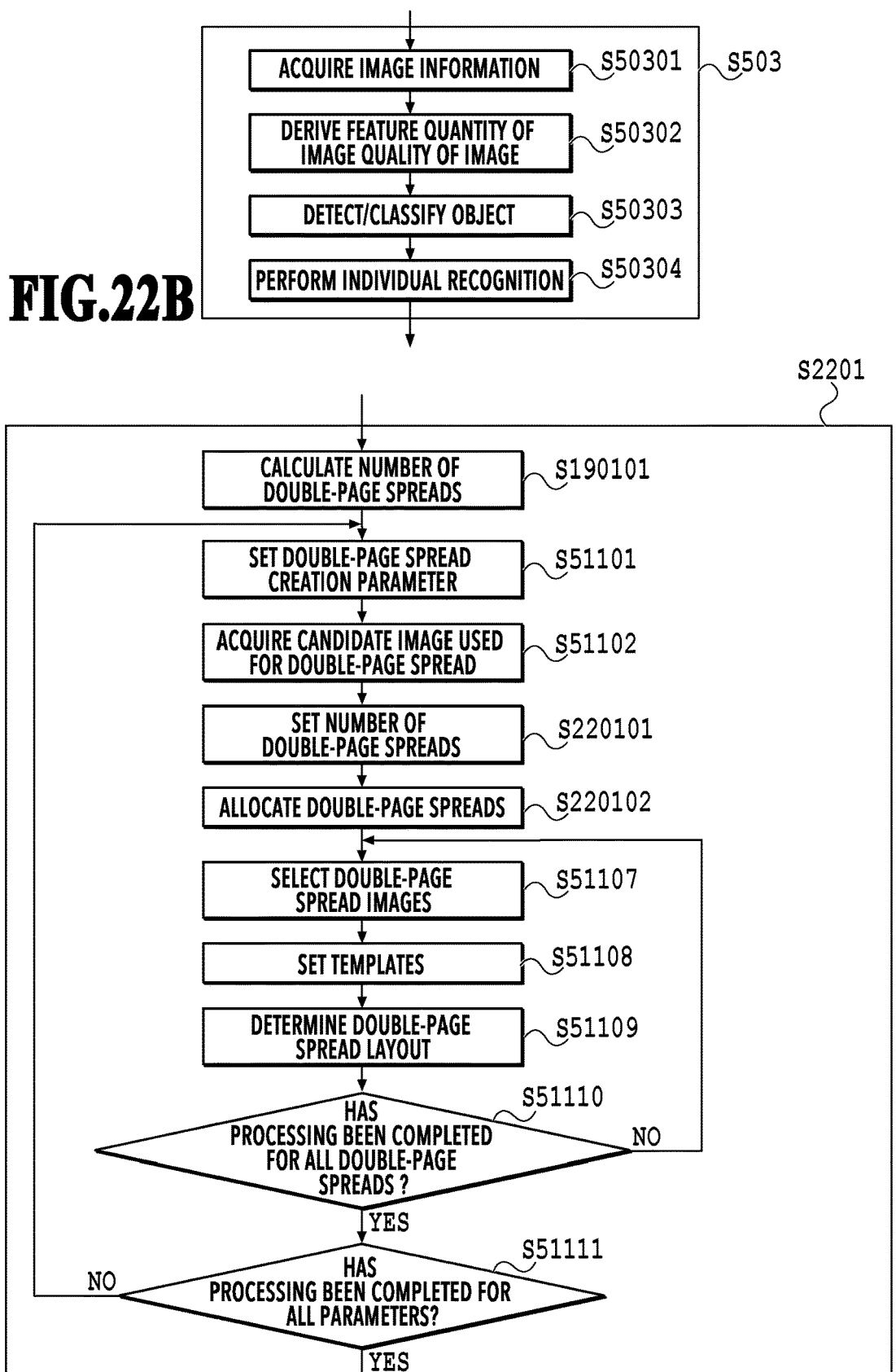

APPARATUS, METHOD AND MEDIUM

BACKGROUND OF THE INVENTION

Field of the Invention

The present disclosure relates to an apparatus, a method, and a medium and more specifically, to an apparatus that creates an album, a method, and a medium.

Description of the Related Art

In addition to the spread of digital cameras, in recent years, due to the spread of smart devices and improvement of the camera performance of smart devices, the number of captured photos of a user is increasing rapidly. Accompanying an increase in the number of captured images, the number of variations of objects that are captured is also increasing.

Conventionally, a method is known, which creates an album by laying out photo images captured by a digital camera. Japanese Patent Laid-Open No. 2016-66328 has proposed a method of creating an album by a plurality of users collaborating.

SUMMARY OF THE INVENTION

In a case where an album is created by a plurality of users providing photos, it is necessary to create an album by taking into consideration photos each user desires to use. With Japanese Patent Laid-Open No. 2016-66328, it is possible to create an album by each user participating in album creation. However, Japanese Patent Laid-Open No. 2016-66328 has not taken into consideration an album having both contents common to all users and contents customized to each individual.

Consequently, in view of the above-described problem, an object of the present disclosure is to create an album having both contents common to all users and contents in accordance with each individual.

One embodiment of the present disclosure is an apparatus that receives instruction for creating at least two albums for each main object, which consist of a plurality of double-page spreads including a common double-page spread used in common in the at least two albums and an individual double-page spread corresponding to the main object, the apparatus comprising: a specification unit configured to specify a first candidate of a number of individual double-page spreads that is set in first album data for creating a first album and a second candidate of a number of individual double-page spreads that is set in second album data for creating a second album different from the first album; and a determination unit configured to determine one of the number indicated by the first candidate and the number indicated by the second candidate, which is smaller, as the number of individual double-page spreads that is set both in the first album data and in the second album data.

Further features of the present disclosure will become apparent from the following description of exemplary embodiments with reference to the attached drawings.

BRIEF DESCRIPTION OF THE DRAWINGS

FIG. 4 is a diagram showing a GUI screen of an album creation application in the first embodiment;

FIG. 5A to FIG. 5C are each a flowchart of automatic layout processing in the first embodiment;

FIG. 7 is a diagram explaining scene classification in the first embodiment;

FIG. 15A to FIG. 15C are each a flowchart of automatic layout processing in the second embodiment;

FIG. 19A to FIG. 19C are each a flowchart of automatic layout processing in the third embodiment;

FIG. 22A to FIG. 22C are each a flowchart of automatic layout processing in the fourth embodiment;

DESCRIPTION OF THE EMBODIMENTS

First Embodiment

In the present embodiment, in an image processing apparatus, an application for album creation (hereinafter, also referred to as "application") is caused to run. This application generates layout information for outputting an album in which a plurality of photo images is laid out automatically. Then, by performing printing by using the layout information, a plurality of albums is created as printed matter. In the present embodiment, a double-page spread common to at least two albums and an individual double-page spread in each album are created. The total number of double-page spreads configuring each album is the same in all the albums in accordance with user specification. However, each of the number of common double-page spreads and the number of individual double-page spreads for each album (that is, for each user) changes in accordance with the image group and the setting. The double-page spreads and the images that are arranged within the double-page spread are arranged in order of the image capturing time.

<About Hardware Configuration of Image Processing Apparatus>

In the following, the hardware configuration of an image processing apparatus in the present embodiment is explained by using FIG. 1. In the following, a case is explained where an image processing apparatus is an information processing apparatus (PC), but it may also be possible to adopt another apparatus, such as a smartphone, as an image processing apparatus.

Figure 1:
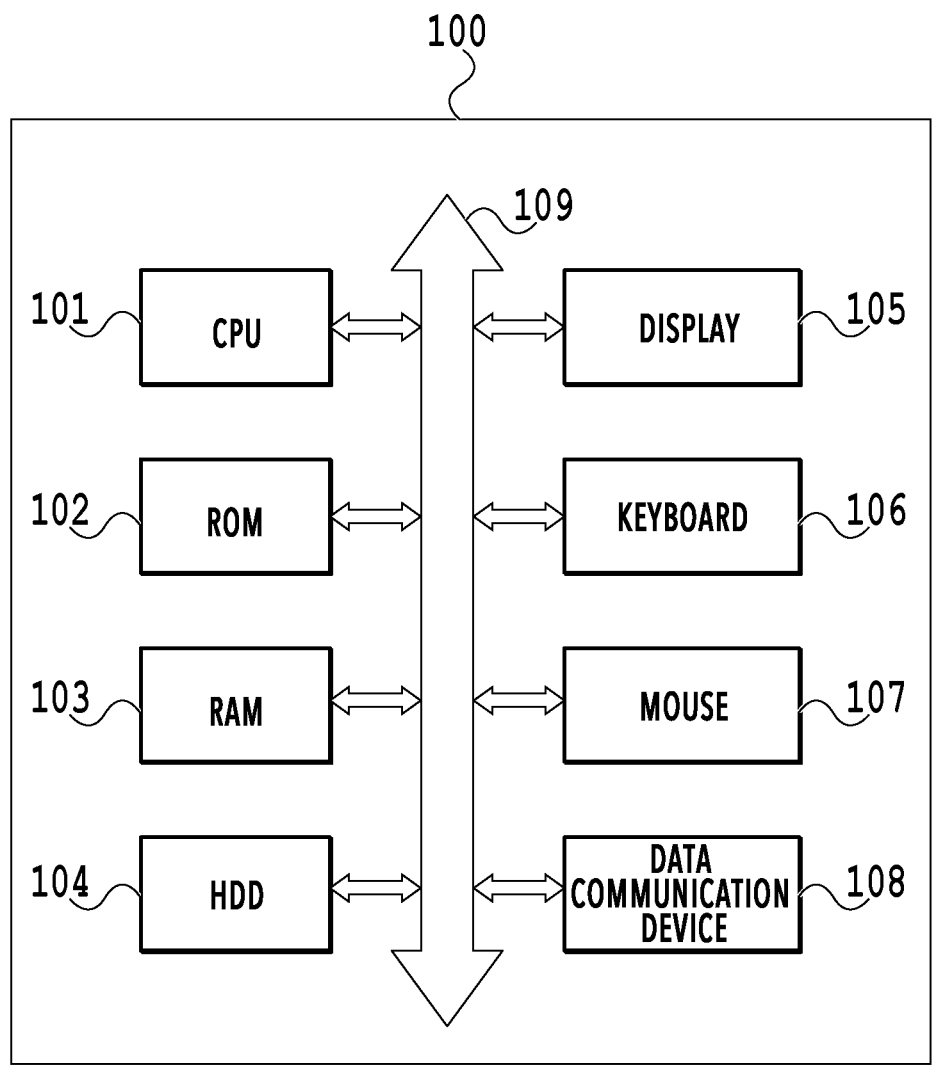
FIG. 1 is a block diagram showing a hardware configuration of an image processing apparatus in a first embodiment.

As shown in FIG. 1, an image processing apparatus 100 has a CPU 101, a ROM 102, a RAM 103, an HDD 104, a display 105, a keyboard 106, a mouse 107, and a data communication device 108. These units are connected by a data bus 109 and are capable of performing transmission and reception of data with one another.

The CPU 101 controls the entire image processing apparatus 100. Further, the CPU 101 performs an image processing method that is explained in the present embodiment in accordance with a program. In FIG. 1, the image processing apparatus has one CPU, but the image processing apparatus may have a plurality of CPUs.

In the ROM 102, programs that are executed by the CPU 101 are stored. The RAM 103 provides a memory for temporarily storing various kinds of information at the time of execution of programs by the CPU 101. In the HDD 104, a database or the like storing image files and processing results of an image analysis and the like is stored, and in the embodiment, in this HDD 104, the application program for album creation is stored. This application program is also called an album creation application and will be described later by using FIG. 4 and the like.

The display 105 is a device for presenting a user interface (hereinafter, UI) of the present embodiment and layout results of images to a user by displaying them. The display 105 may have a touch sensor function. The keyboard 106 is one of input devices possessed by the image processing apparatus 100 and for example, used to input predetermined information onto the GUI displayed on the display 105. In the present embodiment, a user inputs the number of double-page spreads of an album via the keyboard 106. The mouse 107 is one of the input devices possessed by the image processing apparatus 100 and for example, used to click and press down a button on the GUI displayed on the display 105.

The data communication device 108 is a device for communicating with an external device, such as a printer and a server. For example, the layout information, which is results of the automatic layout, is transmitted to a printer or a server connected to the image processing apparatus 100 via the data communication device 108. The data bus 109 connects each of the components described above and the CPU 101. The above is the contents of the hardware configuration of the image processing apparatus in the present embodiment.

<About Software Configuration of Image Processing Apparatus>

In the following, the software configuration of the image processing apparatus in the present embodiment, in other words, the function configuration implemented by the album creation application installed in the image processing apparatus is explained by using FIG. 2A. The album creation application boots up by the icon of the application displayed on the display 105 being double-clicked by a user using the mouse 107. Although the album creation application has a variety of functions, in the following, the automatic layout function provided by an automatic layout processing unit 202 is explained mainly, which is a particularly important function in the present embodiment.

Figure 2A:
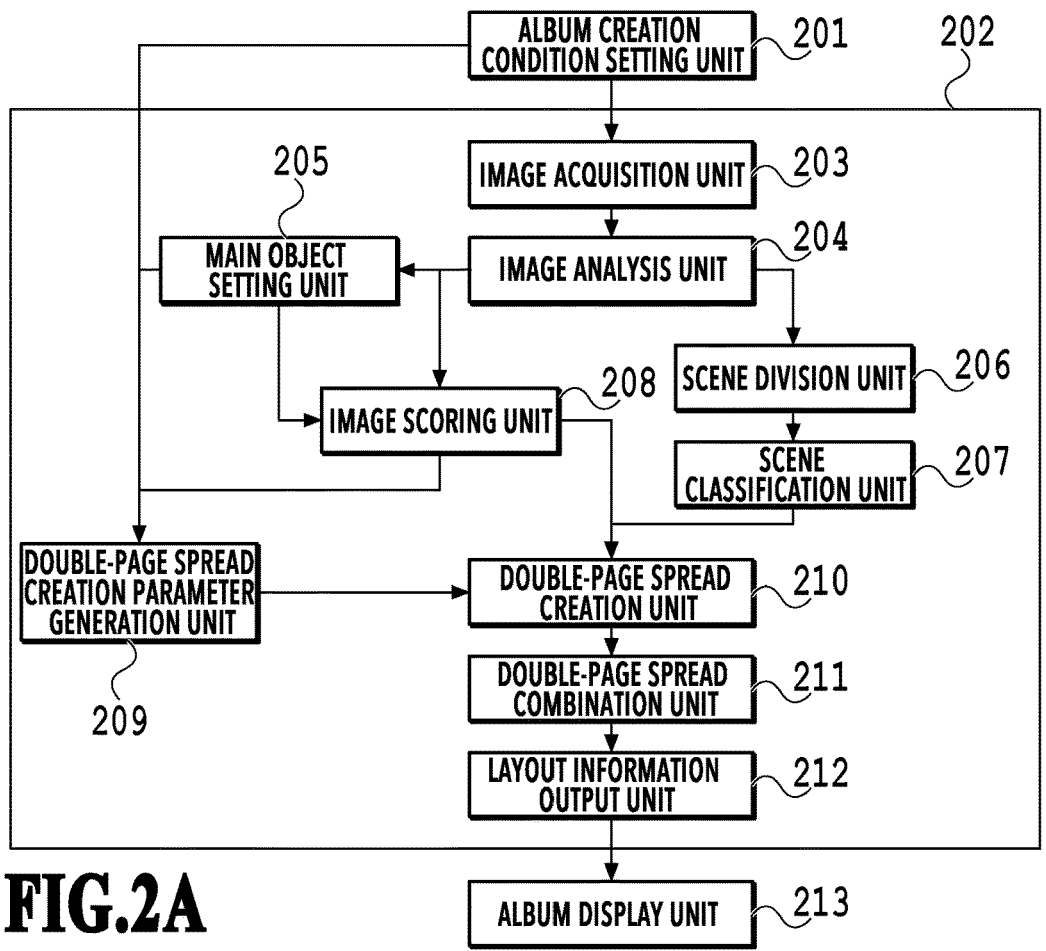
FIG. 2A and FIG. 2B are each a block diagram showing a software configuration of the image processing apparatus in the first embodiment.

As shown in FIG. 2A, this application has an album creation condition setting unit 201, the automatic layout processing unit 202, and an album display unit 213. The "automatic layout function" is a function of creating layout information by laying out an image of a captured photo after classifying the image according to contents and attribute thereof and then selecting the image. An album image based on the created layout information is displayed on the display 105.

The album creation condition setting unit 201 sets album creation conditions in accordance with the mouse operation of a user to the automatic layout processing unit 202. In the present embodiment, as album creation conditions, the image group used for the album, the total number of double-page spreads per album, the commodity material of the album, the number of albums, and the main object for each album are set. It may also be possible to set the image group by using appended information and attribute information on individual piece of image data, for example, such as the image capturing date, or to set the image group based on the file system structure in which image data is saved, such as specification of the device and the directory. The "double-page spread" corresponds to, for example, one display window in display, and corresponds to a pair of pages adjacent to each other printed on different sheets in printing, In album creation, there is a case where an album is formed by printing images on one sheet and folding the sheet at the center. In such a case, the "double-page spread" corresponds to a pair of pages adjacent to each other printed on the same sheet. Here, explanation is given by using the concept of the double-page spread such as this, but a page may be used. Further, the main object is an object that is laid out in a particularly enhanced manner in an album. For example, mention is made of a specific person, a category of object, such as dog, cat, flower, and dish, a hue of an object and the entire image, and the like. Here, for explanation, a person is taken as a main object.

Figure 3B:
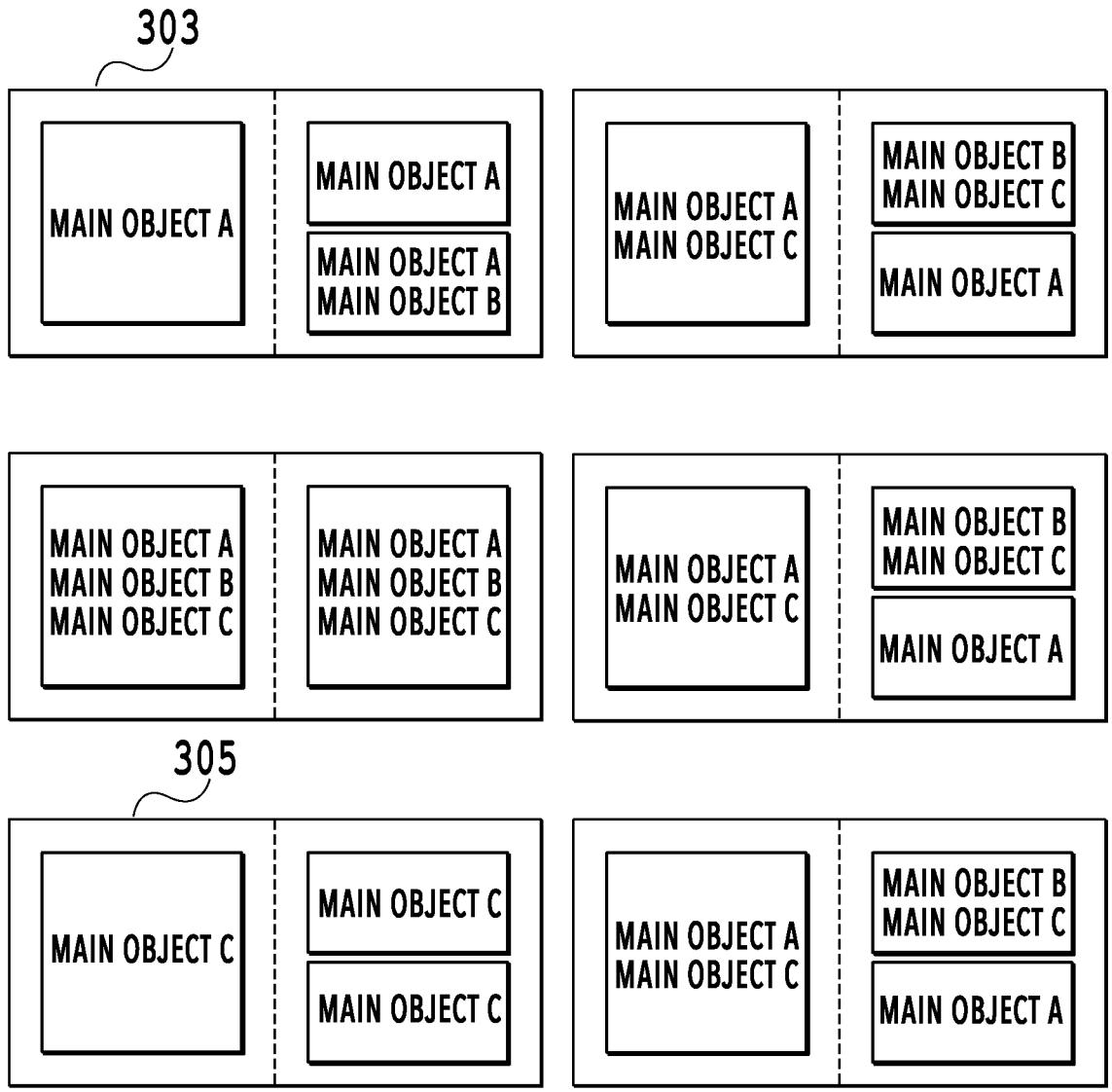
FIG. 3 is a diagram showing a relationship between FIGS. 3A and 3B, and FIG. 3A and FIG. 3B are each a diagram explaining layouts of images in albums that are created in the first embodiment.

Here, albums that are created in the present embodiment are explained by using FIG. 3A and FIG. 3B. In the present embodiment, a plurality of different variations of album is created based on the number of albums and the main object for each album that are set by the album creation condition setting unit 201. In the example in FIG. 3A and FIG. 3B, album 1, album 2, and album 3 are created as a plurality of different variations of album.

Each album consists of a "common double-page spread" on which the same images are laid out in the same arrangement in all the plurality of different variations of album and an "individual double-page spread" on which images different from those of another album are laid out or images are laid out in different arrangement. In other words, the "common double-page spread" is a spread page on which images common to all albums created for each object of interest are laid out. That is, the "common double-page spread" refers to the spread page on which images common to the album 1, the album 2, and the album 3 are laid out. On the other hand, the "individual double-page spread" is a spread page on which different images are laid out in each album created for each object of interest. That is, the "individual double-page spread" is a spread page on which different images are laid out in the album 1, the album 2, and the album 3 and for example, the individual double-page spread provided in the album 1 is not included in the albums 2 and 3. In the example in FIG. 3A and FIG. 3B, each of the album 1 to the album 3 includes a common double-page spread 302. On the other hand, the album 1 includes an individual double-page spread 303, the album 2 includes an individual double-page spread 304, and the album 3 includes an individual double-page spread 305.

An image 301 is an image arranged on the double-page spread and the characters in the image 301 indicate the main object captured in the image. As shown in FIG. 3A and FIG. 3B, in the common double-page spread 302, the image in which a plurality of main objects is captured is included. On the other hand, in each of the individual double-page spreads 303 to 305, an image in which a specific main object is captured is included, such as that in the individual double-page spread 303, an image in which a main object A is captured is included, and so on. As described above, in a case where a plurality of albums is created in the present embodiment, each of the plurality of albums includes a double-page spread created based on a different reference.

An image acquisition unit 203 acquires an image group that satisfies the album creation conditions set by the album creation condition setting unit 201 from among the images saved in the HDD 104. The image group referred to here is the image group that is the layout candidate at the time of album creation. For example, in a case where the period from January 1, XXXX to December 31, XXXX is specified as the image capturing date, all the images captured during the period from January 1, XXXX to December 31, XXXX correspond to the image group of the layout candidate. As the images saved in the HDD 104, mention is made of still images and cutout images cut out from a moving image. The still image and the cutout image are images acquired by an image capturing device, such as a digital camera and a smart device. The image capturing device may be comprised by the image processing apparatus 100 or comprised by an external device of the image processing apparatus 100. In a case where the image capturing device is the external device, the image acquisition unit 203 acquires an image via the data communication device 108. Further, the still image and the cutout image may be images acquired from an external network or server via the data communication device 108. As the image acquired from a network or server, mention is made of a social networking service image (hereinafter, SNS image). The CPU 101 analyzes data attached to image data for each image by executing the program of the OS and finds the source in which the image is saved, that is, the source from which the image is acquired. However, it may also be possible to manage the source from which the image is acquired within the application by acquiring the image from SNS via the application. The image that is acquired by the image acquisition unit 203 is not limited to those described above and may be another kind of image.

An image analysis unit 204 analyzes the image data acquired by the image acquisition unit 203. In the present embodiment, the image analysis unit 204 derives the feature quantity of the image and performs object determination within the image, face detection, expression recognition of the detected face, and individual recognition of the detected face. Further, the image analysis unit 204 acquires information on the image capturing date by referring to data (for example, Exif information) attached to the image data acquired from the HDD 104. The information obtained as the results of the image analysis unit 204 analyzing the image data is called "analysis information".

A main object setting unit 205 sets a main object that is enhanced for each album. In the present embodiment, the main object setting unit 205 acquires information on the main object that is enhanced for each album, which is sent from the album creation condition setting unit 201.

An image scoring unit 208 scores each image based on the album creation conditions set by the album creation condition setting unit 201 and the analysis information derived by the image analysis unit 204. In the present embodiment, each image is scored so that an image suitable to the layout has a high score. At the time of performing scoring so that an image suitable to the layout has a high score, the image analysis information, image classification results, image information, and the album creation conditions are used. However, another piece of information may be used additionally or alternatively. As the image suitable to the layout, mention is made of, for example, an image whose aesthetic appreciation is high, such as that contrast is high and the edge is sharp, and an image in which the object that is the subject (so-called main object) is captured in a large size, such as a person, an animal, and a building. Further, the image scoring unit 208 also performs scoring for each main object that is set by the main object setting unit 205. For example, the image in which the set main object is not captured is scored low even though the image has high aesthetic appreciation. On the other hand, the image in which the set main object is captured in a large size is scored high even though the image is captured in a poor image capturing state, such as the image captured against the light.

A scene division unit 206 divides the image group acquired by the image acquisition unit 203 according to scene by using the analysis information derived by the image analysis unit 204. The "scene" referred to here means a group (sub image group) of images grouped in accordance with analysis information. For example, as regards two images whose image capturing times are different, the scene division unit 206 determines that the two images are the same scene in a case the difference between the image capturing times is less than or equal to a predetermined threshold value or determines that images in which the captured person and background are the same as the same scene.

A scene classification unit 207 determines a relevant category for each scene obtained by the scene division unit 206. As the category of a scene, mention is made of, for example, a situation, such as indoors and outdoors, an event at the time of capturing photos, such as a journey and a wedding.

A double-page spread creation parameter generation unit 209 generates a plurality of parameters for creating a double-page spread based on the main object that is set by the main object setting unit 205 and the analysis information derived by the image analysis unit 204. The parameters referred to here are setting values that determine the double-page spread creation reference. As the parameters such as those, mention is made of, for example, weights and threshold values that determine priority of scores obtained by the image scoring unit 208, which is used at the time of selecting images that are used for the double-page spread. The parameters are setting values to select whether to give priority to an image in which only the specific main object is captured or give priority to an image in which two or more main subjects are captured among the images in which the main objects set by the main object setting unit 205 are captured. By using a plurality of parameters, the creation reference changes depending on the double-page spread for each album.

A double-page spread creation unit 210 creates double-page spread data by selecting and arranging images that are used for the double-page spread in accordance with the parameters generated by the double-page spread creation parameter generation unit 209.

A double-page spread combination unit 211 combines the double-page spread data created by the double-page spread creation unit 210. Specifically, the double-page spread combination unit 211 creates the layout of the entire album by determining the order number of each double-page spread created by the double-page spread creation unit 210.

A layout information output unit 212 outputs layout information in accordance with the layout of the entire album, which is created by the double-page spread combination unit 211. The layout information is data for outputting an album. For example, the layout information is image data in the bitmap format in which each image is arranged in accordance with a predetermined layout. Further, the layout information may be information indicating which image data is arranged on what number page of the album.

The album display unit 213 displays images of the album on the display 105 based on the layout information that is output by the layout information output unit 212.

In a case where the program of the album creation application in the present embodiment is installed in the image processing apparatus 100, the boot icon of the application is displayed on the top screen (desktop) of the OS (Operating System) that runs on the image processing apparatus 100. In a case where a user double-clicks the boot icon on the desktop displayed on the display 105 with the mouse 107, the program of the album creation application saved in the HDD 104 is loaded onto the RAM 103. Then, the program loaded onto the RAM 103 is executed by the CPU 101 and the album creation application boots up. The above is the contents of the software configuration of the image processing apparatus in the present embodiment. The application may have another form and for example, may be a Web application that displays a screen and the like within a browser that runs on the image processing apparatus 100.

<About GUI Screen>

In the following, the GUI screen of the album creation application in the present embodiment is explained by using FIG. 4. FIG. 4 is a diagram showing a GUI screen 401 that is provided by the album creation application having booted up and displayed on the display 105. It is possible for a user to set the album creation conditions via the GUI screen 401.

The GUI screen 401 has a path box 402 and a folder selection button 403 as a setting unit of photo images that are included in an album. The path box 402 is a box for indicating the saving location (path) in the HDD 104 of an image group that is the target of album creation. The folder selection button 403 is a button for selecting the folder including the image group that is the target of album creation. In a case where a user clicks the folder selection button 403 with the mouse 107, a tree configured by a plurality of folders is displayed. Then, in a case where a user selects the folder including the image group that is the target of album creation, the folder path of the selected folder is displayed in the path box 402.

A number of double-page spreads box 404 is a box for specifying the total number of double-page spreads in one album. It is possible for a user to directly input a figure(s) in the number of double-page spreads box 404 by using the keyboard 106 or input a figure(s) in the number of double-page spreads box 404 from a list by using the mouse 107. A number of albums box 410 is a box for specifying the number of albums to be created.

A main object specification unit 405 is an element for specifying a main object that is enhanced for each of the albums corresponding to the number that is input to the number of albums box 410. For example, it is possible for a user to specify a main object by dragging and dropping an image in which the main object is captured in the main object specification unit 405 by using the mouse 107. For example, A, B, or the like described above in FIG. 3A and FIG. 3B is specified.

A number of double-page spread photos setting unit 406 is a slider bar for setting the number of images that are arranged on each double-page spread of the album to be created. In a case where the slider is moved to the "large" side, the number of images that are arranged on each double-page spread increases. On the other hand, in a case where the slider is moved to the "small" side, the number of images that are arranged on each double-page spread decreases.

A commodity material specification unit 407 is an element for setting the commodity material by which the album is created. As specific items relating to the commodity material that is set, it is possible to adopt the size of the album and the kind of sheet of the album. It may also be possible to set the kind of front cover and the kind of binding portion.

An OK button 408 is a button for determining selected conditions as the album creation conditions. In a case where a user clicks the OK button 408 with the mouse 107, the album creation conditions are settled and the album creation conditions are conveyed to the automatic layout processing unit 202 via the album creation condition setting unit 201. To explain specifically, the path information that is input to the path box 402 is conveyed to the image acquisition unit 203. Further, the value of the total number of double-page spreads that is input to the number of double-page spreads box 404 is conveyed to the double-page spread creation unit 210. The value of the number of albums that is input to the number of albums box 410 and the information on the main object specified in the main object specification unit 405 are conveyed to the double-page spread creation parameter generation unit 209.

A Reset button 409 is a button for resetting each of the set contents on the display screen. The above is the contents of the GUI screen of the album creation application in the present embodiment.

<About Automatic Layout Processing>

Figure 5A:
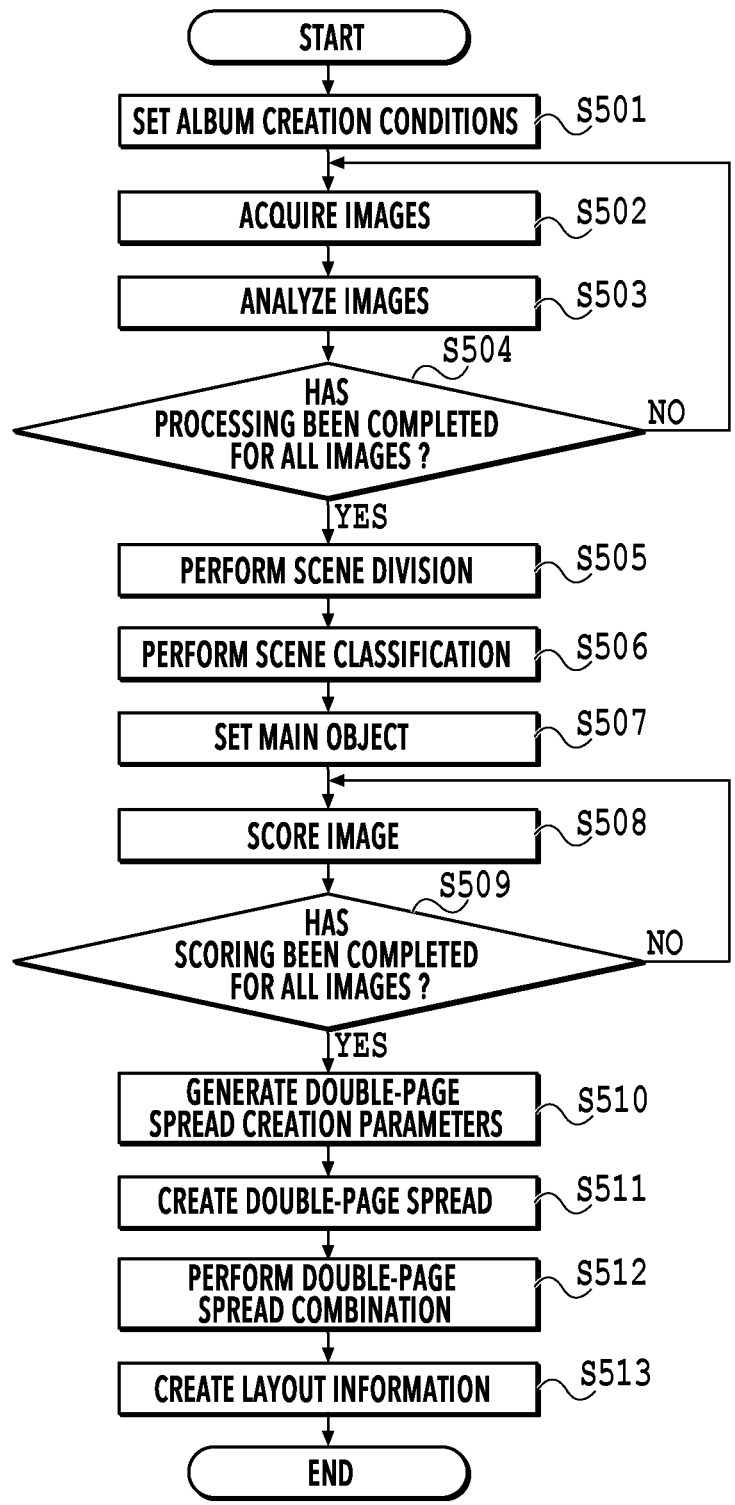

In the following, the automatic layout processing in the present embodiment is explained by using FIG. 5A. FIG. 5A is a flowchart of processing to perform the automatic layout of the album creation application according to the present embodiment. The flowcharts shown in FIG. 5A to FIG. 5C are implemented by, for example, the CPU 101 reading the programs stored in the HDD 104 onto the ROM 102 or the RAM 103 and executing the programs.

At step S501, the album creation condition setting unit 201 sets album creation conditions. In the following, "step S-" is simply abbreviated to "S-". In the present embodiment, as the album creation conditions, the image group that is used in the album, the number of double-page spreads, the number of albums, the main object for each album, the magnitude of the number of images that are arranged on each double-page spread, and the commodity material by which the album is created are set (see FIG. 4).

At S502, the image acquisition unit 203 reads images that satisfy the conditions set at S501 relating to the image group that is used in the album from the HDD 104. Then, the image acquisition unit 203 loads the read images onto the RAM 103.

At S503, the image analysis unit 204 analyzes the images loaded onto the RAM 103 at S502. Here, the image analysis at this step is explained by using FIG. 5B.

At S50301, the image analysis unit 204 acquires the information on the image capturing date corresponding to the image data acquired by the image acquisition unit 203. In the present embodiment, the information on the image capturing date is acquired based on the Exif information attached to each piece of image data.

At S50302, the image analysis unit 204 derives the feature quantity of image quality for the image data acquired by the image acquisition unit 203. As the feature quantity of image quality, for example, there is an in-focus degree. As a method of determining the in-focus degree, it is possible to use an edge detection method, and as the edge detection method, it is possible to use a publicly known Sobel filter. By detecting an edge of the image with the Sobel filter and dividing the difference in luminance between the starting point and the endpoint of the edge by the distance between the starting point and the endpoint, the luminance gradient, that is, the slope of the edge is calculated. By calculating the average slope of the edge in the image, it is possible to regard the image whose average slope is large as being in focus compared to the image whose average slope is small. In the present embodiment, whether the in-focus degree is acceptable is determined by setting a plurality of threshold values for measuring the magnitude of the calculated average slope of the edge and determining whether the calculated slope of the edge is larger than or equal to one of the threshold values. Specifically, as two different slope threshold values, a first slope threshold value and a second slope threshold value (first slope threshold value>second slope threshold value) are set and the in-focus degree is determined with three levels of ○, Δ, and x. In a case where the average slope of the edge in the image is larger than or equal to the first threshold value, the in-focus degree is determined to be favorable (indicated by ○), Further, in a case where the average slope of the edge in the image is less than the first threshold value and larger than or equal to the second threshold value, the in-focus degree is determined to be acceptable (indicated by Δ) and in a case where the average slope of the edge in the image is less than the second threshold value, the in-focus degree is determined to be unacceptable (indicated by x).

At S50303, the image analysis unit 204 performs object detection and classification of the detected object for the image data acquired by the image acquisition unit 203. In the present embodiment, the face is detected as the object. As the face detection method, it is possible to adopt any publicly known method and as the publicly known method such as this, for example, there is AdaBoost that creates a strong discriminator from a plurality of prepared weak discriminators. In the present embodiment, by using the strong discriminator created by AdaBoost, the face of a person is detected. At S50303, the face is detected and at the same time, the top-left coordinate values and the bottom-right coordinate values of the area of the detected face in the image are acquired. By finding these two kinds of coordinate value, it is possible to specify the position of the face and the size of the face. Further, similar to the face of a person, by performing AdaBoost to detect each of an animal, such as a dog and a cat, and a dish, it is possible to detect the objects of a person, an animal, and a dish and at the same time, classify the object within the image. The detection-target object is not limited to those described above and the object may be a flower, a building, an ornament, and the like. Further, here, the case is explained where objects are classified by using AdaBoost, but it may also be possible to adopt image recognition by a deep neural network. That is, it may also be possible to generate a learned model for outputting the kind of object by taking the image as input data and the kind of object included in this image as training data and perform image recognition by using the learned model. At the time of learning, it is recommended to cause the model to learn by associating a plurality of pieces of input data with training data and using the algorithm of the deep neural network.

At S50304, the image analysis unit 204 performs individual recognition for the face detected by the image analysis unit 204. First, the image analysis unit 204 derives a degree of similarity between the extracted face image and the representative face image saved in a face dictionary database for each individual ID. Then, the individual ID whose derived degree of similarity is higher than or equal to a predetermined threshold value and whose degree of similarity is the highest is determined to be ID corresponding to the extracted face image. That is, the person corresponding to the individual ID whose degree of similarity is higher than or equal to the predetermined threshold value and whose degree of similarity is the highest is specified as the person of the extracted face image. In a case where all the degrees of similarity derived for each individual ID are less than the predetermined threshold value, the person of the extracted face image is regarded as a new person and a new individual ID is allocated to the person and the person is registered to the face dictionary database. The face dictionary database is stored in, for example, the HDD 104.

Explanation is returned to FIG. 5A. At S504, the image analysis unit 204 determines whether the processing at S502 to S503 has been completed for all the images of the image group that satisfies the conditions set at S501. In a case where determination results at this step are affirmative, the processing advances to S505 and on the other hand, in a case where the determination results are negative, the processing returns to S502.

At S505, the scene division unit 206 performs scene division for the image group acquired by the image acquisition unit 203. The scene division refers to dividing the acquired image group into a plurality of sub image groups. Specifically, by using the information on the image capturing date, which has already been acquired at S50301, the image group is divided into a plurality of sub image groups based on the time difference of the image capturing dates between images. An example of actual division is as follows.

Figure 6:
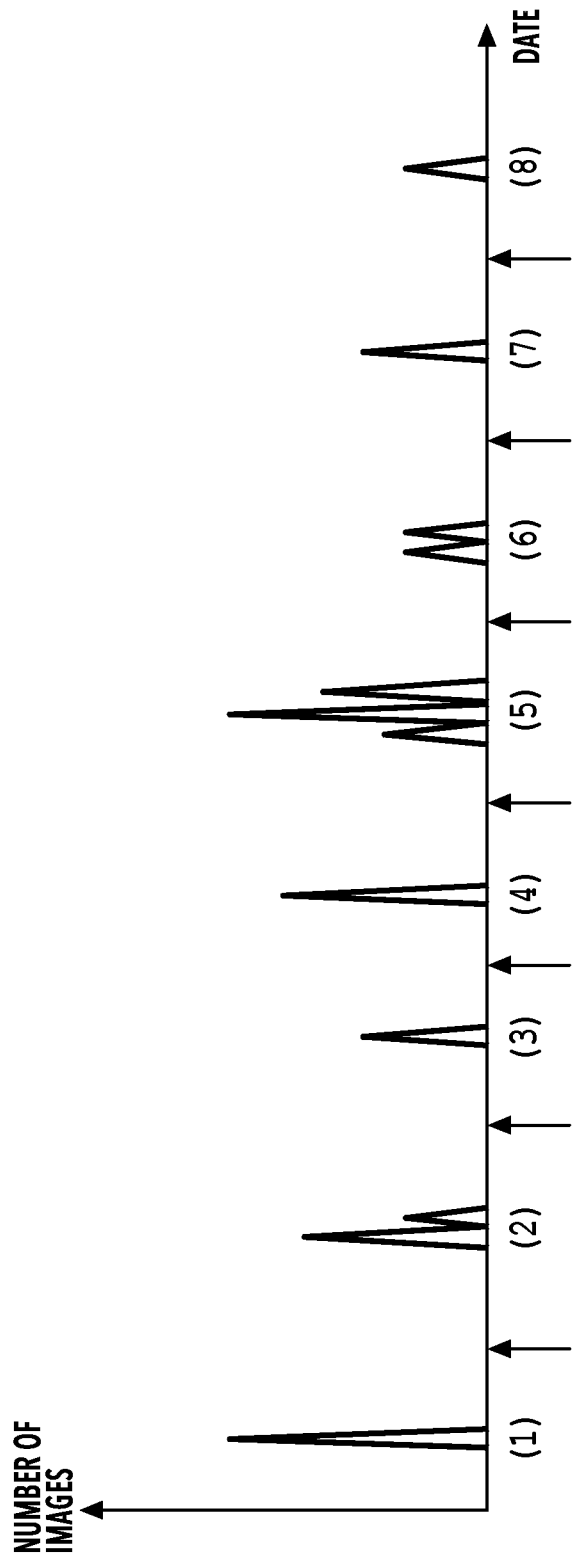
FIG. 6 is a diagram explaining an image group division in the first embodiment.

First, attention is focused on the image whose image capturing time is the oldest (or the newest) and the time difference between the image and the image whose image capturing time is the second oldest (or the second newest) is calculated, and then whether the calculated time difference is larger than or equal to a predetermined threshold value is determined. The processing such as this is performed for all the images by sequentially replacing the image of interest with the image whose image capturing time is newer (or older). "Division" in the present embodiment means dividing the image group into an image group whose image capturing time is new and an image group whose image capturing time is old at a boundary between two images. In the present embodiment, in a case where the difference between the image capturing time of the image of interest and the image capturing time of the image that is next older (or newer) is 16 hours or more, the image group is divided so that these images belong to different sub image groups. The threshold value of the time difference used at the time of division is not limited to this. FIG. 6 shows the results of dividing the image group by using the scene division method described above.

Further, in the present embodiment, the scene division is performed by using the information on the image capturing date, but the information that is used is not limited to this. For example, it may also be possible to divide the image group by using the information on the image capturing location so that images whose image capturing locations are close belong to the same scene. As another example, it may also be possible to use the individual recognition results. For example, in a graduation album, by registering in advance the image of a student belonging to a certain group (class, club activity, and the like) to the application, it may also be possible to take an image group including the images in which the student belonging to the group is captured as one scene (sub image group). As still another example, information other than image information may be used. Here, a method of putting together similar events as one scene is explained. The folder name in which images are saved and tag information attached in social networking service or the like are acquired as meta information accompanying the image. For example, an image group having meta information including a search word is taken as one scene by a search word, such as "athletic meet" and "school excursion". As regards specification of a search word, it may also be possible for a user to select a search word from search words incorporated in advance in the application via the album creation condition setting unit 201 or input a search word to a text box.

At S506, the scene classification unit 207 performs the scene classification for each sub image group obtained at S505. In the following, explanation is given by taking a case as an example where each sub image group (each scene) is classified into one of three categories, that is, "journey", "daily life", and "ceremony", but items according to which classification is performed are not limited to those.

First, a plurality of sub image groups having been determined in advance into which of journey, daily life, and ceremony the sub image group is classified is acquired and the feature quantity of image capturing for each of the acquired plurality of sub image groups is acquired. The feature quantity of image capturing that is acquired here is, for example, the image capturing period, the number of captured images, and the number of captured persons. The image capturing period is the time difference between the image capturing time of the oldest image and the image capturing time of the newest image, both images being included in the sub image group. The number of captured images is the number of images (that is, the number of photos) included in the sub image group. The number of captured persons is the number of faces in the image in which a face or faces are captured, that is, the number of faces included in one image. Then, for the plurality of sub image groups, the average value and the standard deviation of the image capturing period, the average value and the standard deviation of the number of captured images, and the average value and the standard deviation of the number of persons per image are found. In the present embodiment, it is assumed that the number of faces per image is the number of persons per image.

FIG. 7 shows an example of the average value and the standard deviation of the image capturing period (time), the average value and the standard deviation of the number of captured images, and the average value and the standard deviation of the number of persons per image, which are found for the plurality of sub image groups. These found values are incorporated in advance in the program of the album creation application. That is, in the design stage of the application, parameters are generated by learning using images collected in advance and the generated parameters are incorporated in the program. After the album creation application is booted up, the average value of each of the image capturing period, the number of captured images, and the number of persons per image is calculated for each sub image group obtained as a result of division at S505 for the image group specified by a user via the path box 402. Then, for each scene, a score is calculated in accordance with an equation below by using the parameters (specifically, the average value and the standard deviation of each feature quantity of the image capturing period, the number of captured images, and the number of persons of each sub image group) incorporated in advance in the application described previously.

[Equation 1]

score for each scene and for each feature quantity=50−|10×(average value for each scene and for each feature quantity−feature quantity for each sub image group)/standard deviation for each scene and for each feature quantity|     equation (1)

[Equation 2]

average score for each scene=(score of image capturing period for each scene+score of number of captured images for each scene+score of number of captured persons for each scene)/ number of items of feature quantity     equation (2)

By equation (1), the score of each scene and each feature quantity of the sub image group of interest is found. For example, for the journey scene, the score for each of the image capturing period, the number of captured images, and the number of persons is found. These scores are averaged by equation (2) and the average is taken as the score for the journey scene. Similarly, the scores are also obtained for the other scenes, that is, daily life and ceremony. By the method explained above, the average score of the journey scene, the average score of the daily life scene, and the average score of the ceremony scene are calculated for each sub image group. The number of items of the feature quantity in equation (2) is three.

The scene having the highest score of the scores for each scene calculated for each sub image group is classified as the scene of the sub image group. In a case where two or more scenes have the same score, the scene classification is performed in accordance with predetermined priority. For example, in the present embodiment, it is determined in advance that priority is in order of daily life, ceremony, and journey and the highest priority is given to daily life. The order of priority is not limited to this and it may also be possible to enable a user to change the order of priority.

Sub image groups (1) to (8) in FIG. 6 show sub image groups obtained by the scene division for the image group. As regards the sub image group (5) of these sub image groups, it is assumed that the image capturing period is 36 hours, the number of captured images is 300, and the number of captured persons is 1.7. It is also assumed that for those, the average score of journey is 45.32, the average score of daily life is 18.38, and the average score of ceremony is −29.92. In this case, the scene of the sub image group (5) is classified as journey. The classified sub image group is managed in association with a scene ID so that it is possible to identify a scene. In the present embodiment, the case is explained where the image capturing period, the number of captured images, and the number of captured persons are adopted as the feature quantities of image capturing, but the feature quantities of image capturing are not limited to those. For example, it may also be possible to adopt a flag as the feature quantity, which indicates whether or not the sky is captured by image segmentation using machine learning in order to specify indoor or outdoor. Alternatively, it may also be possible to further classify ceremony into smaller ones. For example, in a case where ceremony is classified into one of wedding and reception, the two persons most frequently captured in all the images are taken as a groom and a bride by using individual recognition results. Then, it may also be possible to classify a scene in which there are many photos in which only the groom and the bride are captured into wedding and a scene in which there are many photos in which persons other than the groom and the bride are also captured into reception. Further, it may also be possible to derive the feature quantity by machine learning. For example, it may also be possible to perform the scene classification by preparing the scene desired to be classified and the image group representing the scene and performing learning by using Convolution Neural Network (CNN) so that the input is the image and the output is the scene classification results. That is, it may also be possible to generate a learned model for outputting a scene by taking an image as input data and the scene of the image as training data and perform image recognition by using the learned model At the time of learning, it is recommended to cause the model to learn by associating a plurality of pieces of input data with training data and using the algorithm of CNN.

At S507, the main object setting unit 205 sets the main object of each album. In the present embodiment, the information on the main object of each album is acquired, which is transmitted from the album creation condition setting unit 201. Here, for explanation, it is assumed that the main object A is set to the album 1 and a main object B is set to the album 2 for the two kinds of album.

At S508, the image scoring unit 208 scores each image. This processing is called image scoring processing. The "score" that is derived at this step is a parameter for evaluating use applicability to an album and a score obtained by evaluation from the perspective, to be described later, is given for each piece of image data and the score is referred to at the time of image selection, to be described later. In the present embodiment, in addition to the level of image quality, a score is given for each main object set at S507. First, a score in accordance with the feature quantity of image quality derived at S50302 is given. Here, it is assumed that 1 is given in a case where the in-focus degree is ○ (favorable), 0.5 is given in a case of Δ (acceptable), and 0 is given in a case of x (unacceptable). Due to this, it is possible to increase the score of an image in focus. In the present embodiment, as the feature quantity of image quality, the in-focus degree is adopted, but the feature quantity of image quality is not limited to this. For example, it may also be possible to use the image size, the image capturing information, such as information on the lens used at the time of image capturing, or the compression format of the image that is input to the application.

After giving a score in accordance with the feature quantity of image quality, the image scoring unit 208 gives a score for each main object that is set. That is, in the present embodiment, three kinds of score are given to one image, specifically, scores obtained by evaluation from three perspectives, that is, whether the image quality is good, whether the main object A is captured, and whether the main object B is captured are given. For scoring of each main object, it is possible to use the size of the face derived at S50303 and the individual recognition results at S50304. In a case where the main object is not captured in the image, 0 is given and in a case where the main object is captured, the ratio in which the face of the individual that is set as the main object occupies the image size is given as a score for each main object. In the present embodiment, scoring for each main object s performed by using the face size, but it may also be possible to use an item other than the face size. For example, the expression of the person, who is the main object, is determined and in a case where the face is a smiling face, the score may be increased. Further, in a case where an object other than a person is set as the main object, scoring is performed similarly in accordance with the object size by using the object detection and the classification results at S50303. As a result of the above processing, for example, the score of the image quality, the score of the main object A, and the score of the main object B are calculated for the first image. For example, for the image in which the main object A is captured but the main object B is not captured, the score is calculated for each perspective, such as that the score of the image quality is 1, the score of the main object A is 1, and the score of the main object B is 0.

At S509, the image scoring unit 208 determines whether the scoring at S508 has been completed for all the images of the image group acquired by the image acquisition unit 203. In a case where determination results at this step are affirmative, the processing advances to S510 and on the other hand, in a case where the determination results are negative, the processing returns to S508.

At S510, the double-page spread creation parameter generation unit 209 generates double-page spread creation parameters by receiving the information on the main object for each album from the main object setting unit 205 as well as receiving the album creation conditions from the album creation condition setting unit 201. The double-page spread creation parameters are setting values that are used at the time of selecting and laying out images configuring the double-page spread, to be described later. For example, the double-page spread creation parameter generation unit 209 generates a weight to control to which of the score in accordance with the image quality and the score of each main object priority is given at the time of selecting an image that is used for the double-page spread based on the score given to the image at S508, a threshold value that is the reference of image selection, and the like. The double-page spread creation parameter generation unit 209 generates a "common parameter" common to all the albums and an "individual parameter" different for different albums as the double-page spread creation parameters. That is, the double-page spread creation parameter generation unit 209 generates double-page spread creation parameters equal to (the number of albums+1). Due to this, it is possible to create a "common double-page spread" on which the double-page spread whose images configuring the double-page spread and whose arrangement are the same appears in a plurality of albums and a "individual double-page spread" on which the images configuring the double-page spread and the arrangement appear in a specific album. In the present embodiment, to the common parameter, a weight is set by which each score given to the image is evaluated equally. A score $^I score_s$ representing a certain image I in a case where a common parameter $w_i$ is used is expressed by equation (3) below.

[Equation 3]

$$^I score_s = \Sigma_i w_i \cdot {}^I score_i \quad \text{equation(3)}$$

Here, 'score' indicates the ith score given to the image I and $w_i$ indicates the weight for each score. In the present embodiment, by setting $w_i$ to ⅓, the score of the image quality, the score of the main object A, and the score of the main object B are evaluated equally. Due to this, priority is given to the image whose image quality is good and in which many persons whose score is high are captured.

On the other hand, to the individual parameter, a weight that gives priority to the image in which the main object for each album is captured is set. A score 'score' representing the certain image I in a case where an individual parameter $w_o$ is used is expressed by equation (4) below.

[Equation 4]

$$^I score_I = \begin{cases} 0 & (^I score_o = 0) \\ \dfrac{w_q \cdot {}^I score_q + w_o \cdot {}^I score_o}{2} & \text{(otherwise)} \end{cases} \quad \text{equation(4)}$$

Here, $^I score_q$ indicates the score of the image quality given to the image I, $^I score_o$ indicates the score of a main object O given to the image I, $w_q$ indicates the weight for the score of the image quality, and $w_o$ indicates the weight for the main object O. In the present embodiment, by setting $w_q$ and $w_o$ to 1 ($w_q = w_o = 1$), only the image in which the main object is captured is evaluated and the image to which priority is given is determined based on the image quality and the size of the main object. In the present embodiment, as the double-page spread creation parameter, the weight for the score is used, but the double-page spread creation parameter is not limited to this. For example, it may also be possible to include the number of double-page spreads to be created in the double-page spread creation parameters. Further, both $^I score_s$ and $^I score_I$ are found so that the score is high in a case where the main object is captured, but this is not limited. For the image in which the main object is not captured, such as a landscape, it is may also be possible to calculate the score separately based on the score of the image quality, the image information, and the like. For example, it may also be possible to take the score of the image quality as the representative score for the image whose difference in the image capturing time from the image whose score is high is small. Due to this, it is also possible to give a high score to an image having a strong possibility of being related to the photo in which the main object is captured.

Figure 2B:
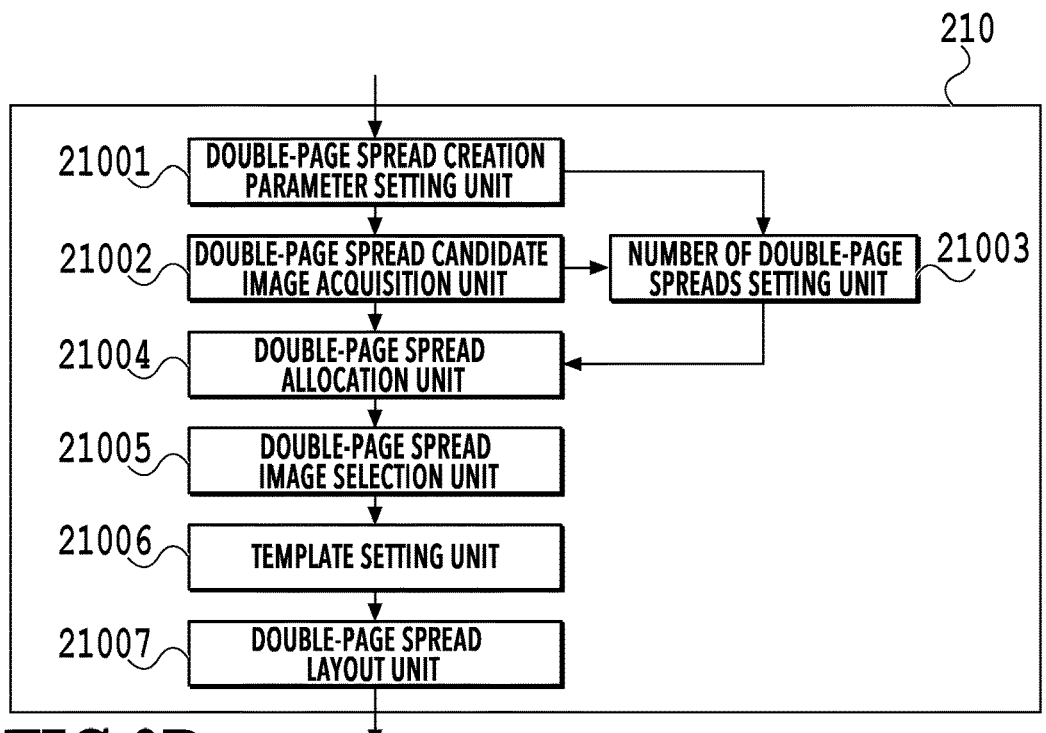

At S511, the double-page spread creation unit 210 creates double-page spread data of the album by using the parameters generated at S510. Here, the double-page spread creation processing at this step is explained by using FIG. 2B and FIG. 5C. FIG. 2B is a detailed block diagram of the double-page spread creation unit 210. FIG. 5C is a detailed flowchart of double-page spread creation at S511.

At S51101, a double-page spread creation parameter setting unit 21001 reads one of the parameters generated at S510. In the present embodiment, the individual parameter of the albums 1, the individual parameter of the album 2, and the common parameter are read in this order.

At S51102, a double-page spread candidate image acquisition unit 21002 acquires a candidate image that is used for the double-page spread from among all the image groups acquired by the image acquisition unit 203 based on the score given at S508 and the double-page spread creation parameter set at S51101. In the present embodiment, based on the score found at S508 and the double-page spread creation parameter set at S51101, in accordance with equation (3) or equation (4), scoring for each image is performed again (re-scoring of image). Then, the image whose score obtained as a result of re-scoring is higher than or equal to a predetermined threshold value is acquired as the candidate image. In a case where there is no candidate image, the image having the highest score is taken as the candidate image. Here, the candidate image is acquired from all the image groups, but this is not limited. It may also be possible to exclude the image having already been selected in image selection processing, to be described later.

At S51103, a number of double-page spreads setting unit 21003 determines whether the double-page spread creation parameter set at the immediately previous S51101 is the individual parameter. In a case where determination results at this step are affirmative, the processing advances to S51104 and on the other hand, in a case where the determination results are negative, the processing advances to S51105.

In a case of YES at S51103 (that is, in a case where the individual parameter is set at the immediately previous S51101), at S51104, the number of double-page spreads setting unit 21003 sets the number of double-page spreads based on the results of the scene division performed at S505 and the candidate image acquired at S51102. In the present embodiment, in accordance with equation (5) and equation (6) below, the number of double-page spreads is set.

[Equation 5]

number of double-page spreads for each scene=ceil (number of candidate images in scene÷maximum number of images per double-page spread)     equation (5)

[Equation 6]

number of individual double-page spreads=Σnumber of double-page spreads for each scene     equation (6)

By equation (5) and equation (6), the number of double-page spreads created with the individual parameter is found. The maximum number of images per double-page spread is set based on the user input via the number of double-page spread photos setting unit 406. In a case where the number of individual double-page spreads is larger than or equal to the total number of double-page spreads that is set at S501, equation (7) below is followed.

[Equation 7]

number of individual double-page spreads=total number of double-page spreads−1     equation (7)

By equation (7), it is possible to cause double-page spreads created with different parameters, such as the individual parameter and the common parameter, to exist mixedly in one album. Due to this, for each scene, it is possible to set the number of individual double-page spreads in accordance with the number of images in which the main object is captured frequently. It may also be possible to set an upper limit value and a lower limit value for the number of individual double-page spreads.

On the other hand, in a case of NO at S51103 (that is, the common parameter is set at the immediately previous S51101), at S51105, the number of double-page spreads setting unit 21003 sets the number of double-page spreads in accordance with equation (8) below.

[Equation 8]

number of common double-page spreads=total number of double-page spreads−MIN (total number of individual double-page spreads of each album)      equation (8)

By equation (8), it is possible to set the number of common double-page spreads that is in accordance with both the number of individual double-page spreads and the total number of double-page spreads.

Here, the case is explained where the number of double-page spreads is set in accordance with the number of candidate images, but the setting method of the number of double-page spreads is not limited to this, For example, it may also be possible for the double-page spread creation parameter generation unit 209 to set the number of double-page spreads within the parameter and for the number of double-page spreads setting unit 21003 to read the number of double-page spreads set within the parameter. Further, for example, it may also be possible for the double-page spread creation parameter generation unit 209 to set the number of double-page spreads incorporated in advance in the program of the album creation application or calculate the number of double-page spreads based on the ratio between the individual double-page spread specified by a user and the common double-page spread.

At S51106, a double-page spread allocation unit 21004 divides the candidate images acquired at S51102 into sub image groups corresponding to the number of double-page spreads set at S51104 or S51105 and allocates the sub image groups. In the present embodiment, the candidate images are arranged in order of the image capturing time acquired at S50301 and the candidate images are divided at the position where the time difference in the image capturing time between adjacent images is large. The processing such as this is performed until the candidate images are divided into sub image groups corresponding to the number of double-page spreads set at S51104 or S51105. That is, the division is performed (the number of double-page spreads−1) times. Due to this, it is possible to create an album in which the images are arranged in order of the image capturing time. It may also be possible to perform the processing at S51106 in units of scenes. For example, the double-page spread allocation unit 21004 arranges the images to which the journey scene is allocated among the candidate images in order of the image capturing time and performs division. Following this, the double-page spread allocation unit 21004 arranges the images to which the daily life scene is allocated among the candidate images in order of the image capturing time and performs division. As above, it may also be possible for the double-page spread allocation unit 21004 to perform the division processing while switching the scenes.

A S51107, a double-page spread image selection unit 21005 selects images that are used for the layout from among the candidate image group allocated to the processing-target double-page spread at S51106. In the following, by using FIG. 8, explanation is given by taking a case as an example where four images are selected from among the candidate image group allocated to a certain double-page spread. Here, it is assumed that the double-page spread refers to two pages and the first double-page spread and the last double-page spread include one page. The number of images selected as images used for the layout is not limited to four. The number of images selected as images used for the layout is determined, for example, in accordance with the number of images that is set in the number of double-page spread photos setting unit 406. Specifically, the number of images may be determined in such a manner that in a case where "small" at the first level is set by the slider bar of the number of double-page spread photos setting unit 406, the number of images is determined to be one, in a case of the second level, it is determined to be two, in a case of the third level, it is determined to be three, in a case of the fourth level, it is determined to be four, in a case where "large" at the fifth level is set, it is determined to be five, and so on.

Figure 8:
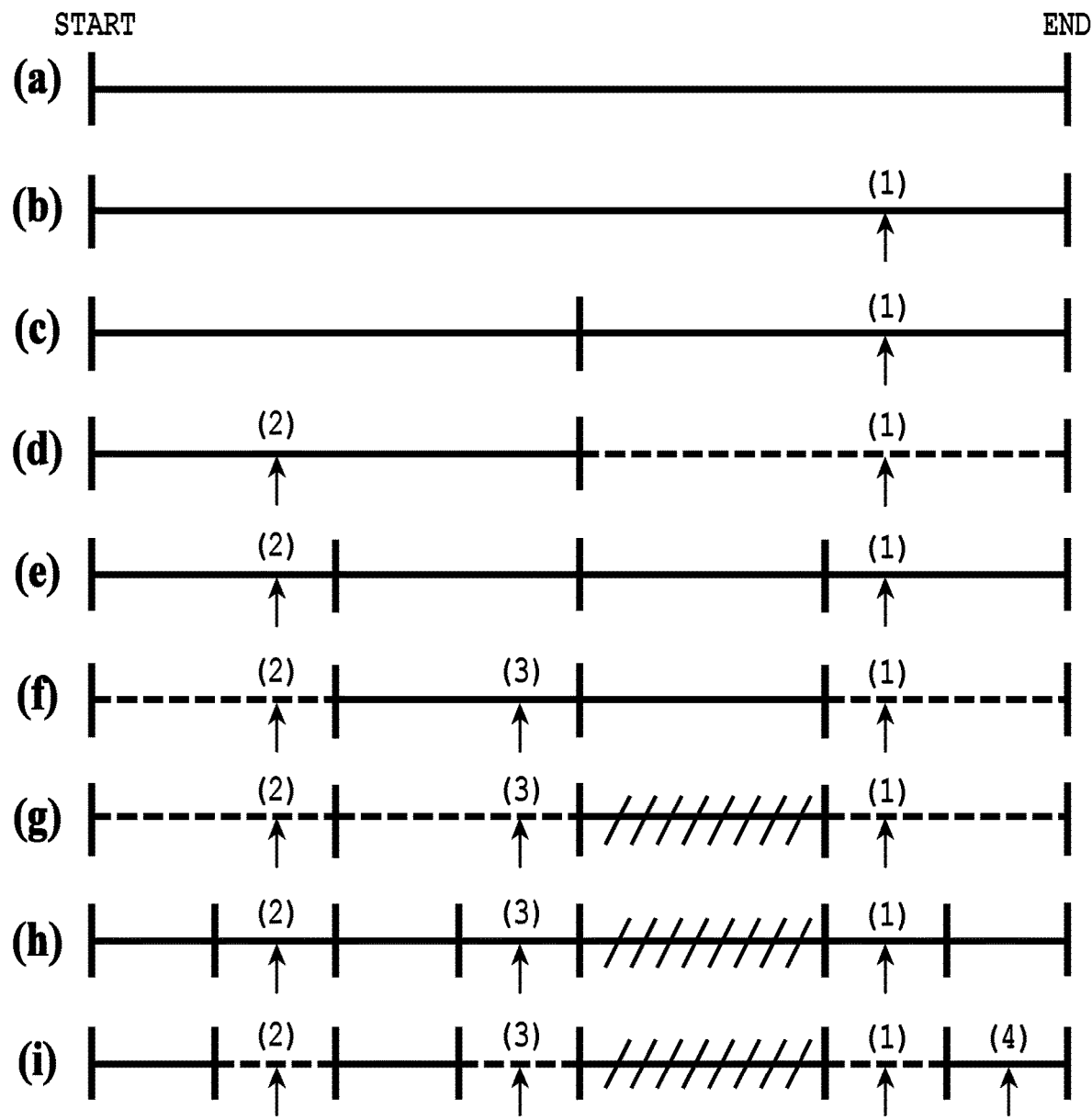
FIG. 8 is a diagram explaining image selection in the first embodiment.

In FIG. 8, (A) indicates the time difference in the image capturing date from the first image included in the candidate image group allocated to the double-page spread to the last image, in other words, the image capturing period of the candidate image group. By using (B) in FIG. 8, a method of selecting the first image at the time of selecting four images is explained. From among all the images captured during the image capturing period of the candidate image group shown in (B) in FIG. 8, the image whose score for which re-scoring has been performed at S51102 is the highest is selected as the first image. In selecting the second and subsequent images, by selecting images by dividing the image capturing period of the candidate image group into smaller periods, the selected images are prevented from concentrating on a portion of the image capturing period of the candidate image group. First, as shown in (C), the image capturing period of the candidate image group is halved into two image capturing sections (periods). That is, the image capturing period is halved (grouped) into two image capturing sections. Next, as shown in (D) in FIG. 8, the image whose score is the highest among the images belonging to the image capturing section (section indicated by a solid line) in which the first image is not selected is selected as the second image. Next, as shown in (E) in FIG. 8, each image capturing section in (D) is halved. The image whose score is the highest is selected as the third image from among the images in the image capturing sections indicated by a solid line in (F) in FIG. 8, that is, the images captured in the two image capturing sections in which neither first image nor second image is selected (images corresponding to the two image capturing sections). Next, a case where no image exists in the image capturing section of the range in which an image is to be selected and an image cannot be selected is explained by taking selection of the fourth image as an example, In the present embodiment, regardless of the number of images, the image capturing period is divided in accordance with time. Consequently, there is a case where no image exists in the image capturing section obtained by division. For example, it is assumed that although it is desired to select the fourth image from the image capturing section (image capturing section indicated by slashes) in which no image is selected yet, no image exists in the image capturing section as shown in (G) in FIG. 8. In such a case, as shown in (H) in FIG. 8, each image capturing section in which an image has already been selected is halved. Next, as shown in (I) in FIG. 8, the image whose score is the highest is selected as the fourth image from among the images captured in the image capturing sections indicated by a solid line, in which none of the first to third images is selected. In a case where the number of images to be selected increases or decreases from four, images are selected similarly as described previously.

Explanation is returned to FIG. 5C. At S51108, a template setting unit 21006 selectively sets a plurality of templates to be used for the layout from among the templates saved in the HDD 104. At this step, templates with a design satisfying the album creation conditions set at S501 are set.

Figure 9:
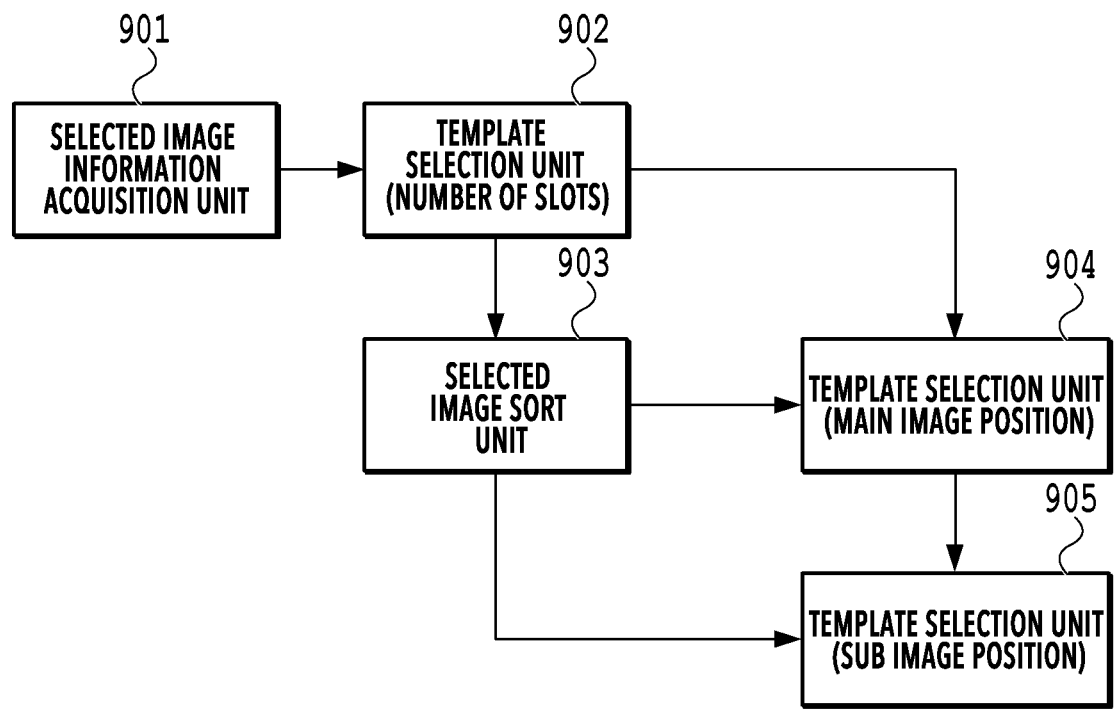
FIG. 9 is a block diagram explaining template determination in the first embodiment.

At S51109, a double-page spread layout unit 21007 determines an image layout for the processing-target double-page spread. Specifically, the double-page spread layout unit 21007 determines a template suitable for laying out the images selected at S51107 from among the plurality of templates set at S51108. Here, a method of determining a template at this step is explained by using FIG. 9. FIG. 9 is a function block diagram relating to template determination.

Figure 10:
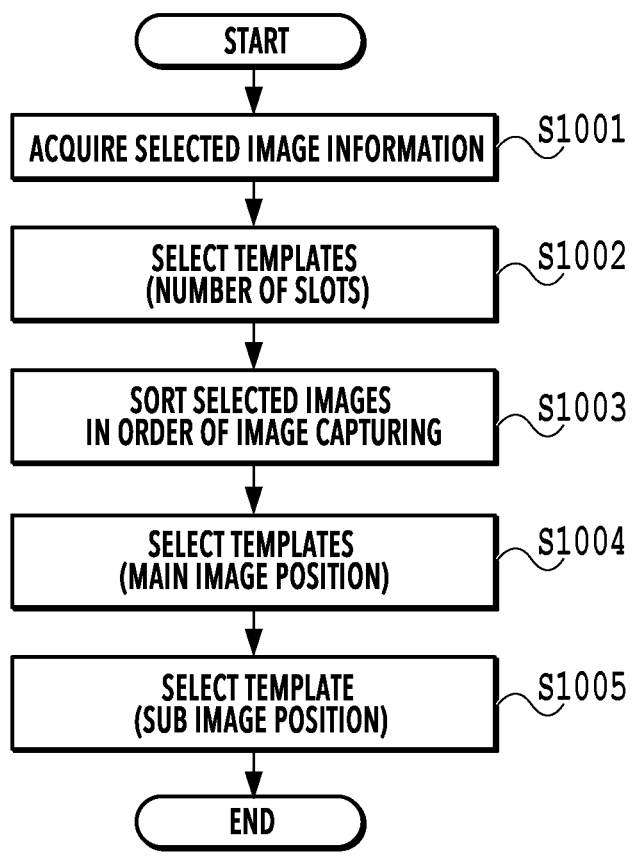
FIG. 10 is a flowchart of template determination processing in the first embodiment.

A selected image information acquisition unit 901 acquires the number of images selected by the double-page spread image selection unit 21005 and information relating to the images. The image information that is acquired is the width and height of the image, the image capturing date information, and the score calculated by the image scoring unit 208. A template selection unit 902 selects templates having the number of slots equal to the number of selected images from among the templates set by the template setting unit 21006. A selected image sort unit 903 sorts the selected images in order of the image capturing time (image capturing date). A template selection unit 904 selects templates whose order number of the main slot in which the main image is arranged matches with the order number of the main image in a case where the images are arranged in order of the image capturing time from among the templates selected by the template selection unit 902. Here, the "main image" is the image whose score obtained as a result of re-scoring at S51102 is the highest among the plurality of images selected as the double-page spread images and on the other hand, the image that is not the main image among the plurality of images is referred to as "sub image". At the time of selecting a template, in addition to the order number, that the aspect ratio of the main image and the aspect ratio of the slot in which the main image is arranged match with each other is the selection condition. In the present embodiment, it is assumed that at the top left of the template, the image whose image capturing time is older is laid out and at the bottom right, the image whose image capturing time is newer is laid out. A template selection unit 905 selects a template from among the templates selected by the template selection unit 904, whose order number of the slot in which the sub image is arranged matches with the order number of the sub image in a case where the images are arranged in order of the image capturing time and the aspect ratios of the image and the slot match with each other. FIG. 10 is a flowchart of template determination processing.

At S1001, the selected image information acquisition unit 901 acquires the selected image information. In the selected image information that is acquired at this step, the number of selected images is included. Here, for explanation, it is assumed that the number of selected images is three.

Figure 11:
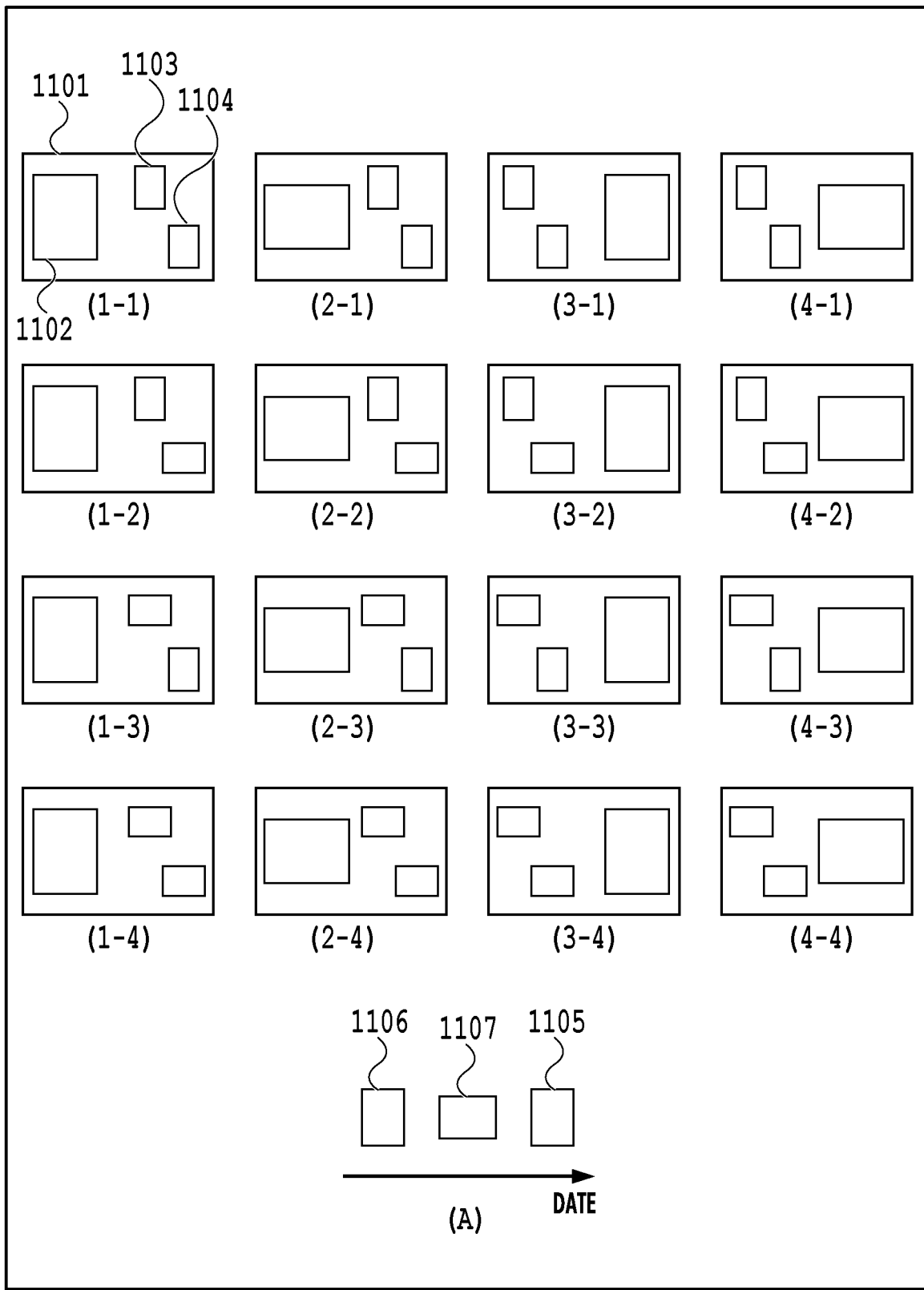
FIG. 11 is a diagram explaining an image layout determination method in the first embodiment.

At S1002, the template selection unit 902 selects templates whose number of slots matches with the number of selected images. Here, it is assumed that the number of images selected at S1001 is three and the templates whose number of slots is three are selected. In the following, explanation is given by taking a case where templates of (1-1) to (4-4) shown in FIG. 11 are selected at this step as an example.

At S1003, the selected image sort unit 903 arranges the selected images in order of the image capturing time. Here, it is assumed that a relationship shown in (A) in FIG. 11 is obtained as a result of arranging the selected images in order of the image capturing time. Further, it is assumed that an image 1105 is the main image and an image 1106 and an image 1107 are the sub images.

At S1004, the template selection unit 904 selects templates whose arrangement position of the slot for the main image (referred to as main slot) matches with the arrangement position of the main image in a case where the images are arranged in order of the image capturing time and whose aspect ratio of the main slot matches with the aspect ratio of the main image. Here, the image 1105 is the image whose image capturing time is the newest and which is the image for the main slot, and therefore, the template candidates are (3-1) to (3-4) in FIG. 11.

At S1005, the template selection unit 905 selects a template whose aspect ratio of the slot for the sub image (referred to as sub slot) matches with that of the sub image. In the example in FIG. 11, the older image 1106 for the sub slot, that is, the image desired to be arranged at the top left is the portrait image and the newer image 1107 for the sub slot is the landscape image. Consequently, the template of (3-2) is determined as the template the most suitable for the three selected images. As described above, at S51109, the template used for the layout for the double-page spread and the information capable of identifying which image is laid out in which slot of the template are determined. The information determined here is called double-page spread data.

Explanation is returned to FIG. 5C. At S51110, the double-page spread layout unit 21007 determines whether the processing at S51107 to S51109 has been completed for all the processing-target double-page spreads. In a case where determination results at this step are affirmative, the processing advances to S51111 and on the other hand, in a case where the determination results are negative, the processing returns to S51107.

At S51111, the double-page spread creation parameter setting unit 21001 determines whether the processing at S51101 to S51110 has been completed for all the parameters generated at S510. In a case where determination results at this step are affirmative, the processing advances to S512 and on the other hand, in a case where the determination results are negative, the processing returns to S51101.

Explanation is returned to FIG. 5A. At S512, the double-page spread combination unit 211 determines the double-page spread number within the album for each piece of double-page spread data created by the double-page spread creation unit 210 and creates the layout of the entire album. In the present embodiment, the double-page spread data is arranged so that the images are arranged in order of the image capturing time based on the image capturing times of the images arranged in the double-page spread data.

Figure 12:
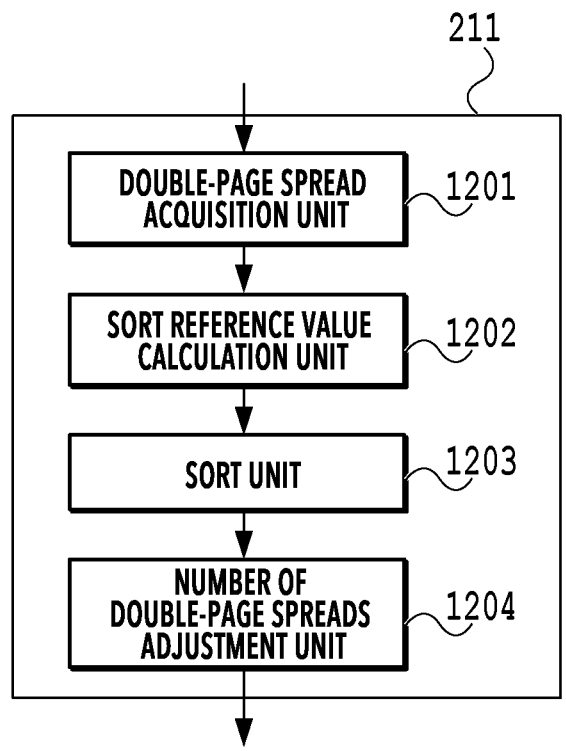
FIG. 12 is a detailed block diagram of a double-page spread combination unit in the first embodiment.
Figure 13:
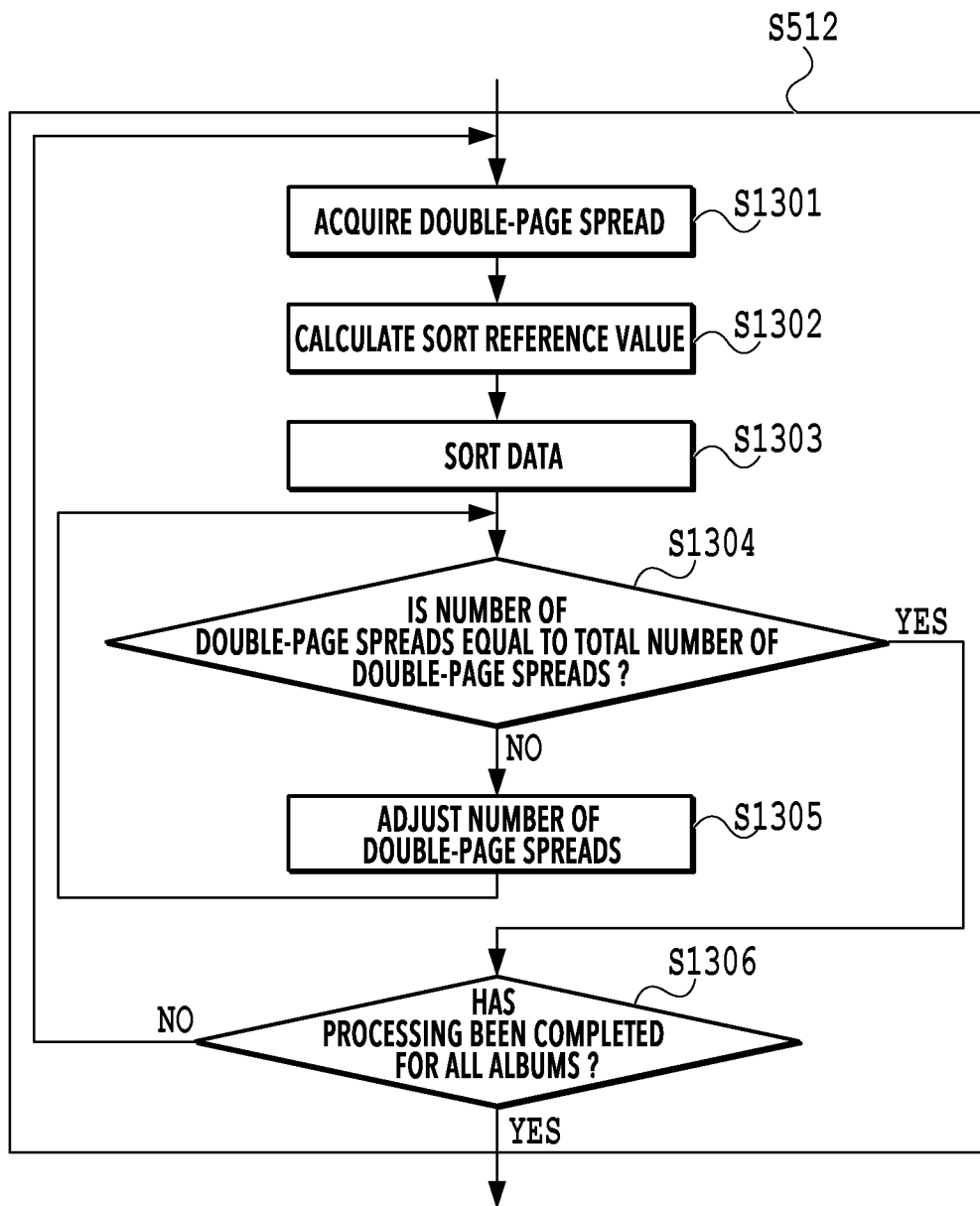
FIG. 13 is a flowchart of double-page spread combination processing in the first embodiment.

In the following, double-page spread combination at S512 is explained in detail by using FIG. 12 and FIG. 13. FIG. 12 is a block diagram showing a detailed configuration of the double-page spread combination unit 211 in the present embodiment. FIG. 13 is a flowchart of processing performed by the double-page spread combination unit 211.

At S1301, a double-page spread acquisition unit 1201 acquires double-page spread data relating to one album among the double-page spread data created by the double-page spread creation unit 210. In the present embodiment, for example, the double-page spread data relating to the album 1, which is acquired at this step, includes double-page spread data created with the common parameter and double-page spread data created with the individual parameter of the album 1.

At S1302, a sort reference value calculation unit 1202 calculates a value that is a reference of sort for each piece of double-page spread data acquired by the double-page spread acquisition unit 1201. In the present embodiment, it is assumed that the reference value of sort is the average image capturing time (average of image capturing date for each image) of the images arranged in the double-page spread data. The reference value of sort is not limited to the image capturing time. For example, the reference value of sort may be the average image capturing position (latitude and longitude) of the images arranged in the double-page spread data or the number of images, or it may also be possible to use image analysis information, such as a color histogram.

At S1303, a sort unit 1203 sorts the double-page spread data of the individual double-page spread and the double-page spread data of the common double-page spread acquired by the double-page spread acquisition unit 1201 based on the sort reference value calculated by the sort reference value calculation unit 1202. In the present embodiment, the double-page spread data is arranged in ascending order from the double-page spread whose average image capturing time is the earliest.

At S1304, a number of double-page spreads adjustment unit 1204 determines whether the number of pieces of the double-page spread data of the processing-target album is the same as the total number of double-page spreads set at S501. In a case where determination results at this step are affirmative, the processing advances to S1306. On the other hand, in a case where determination results at this step are negative, that is, in a case where the number of double-page spreads of the album exceeds the total number of double-page spreads as a result of the number of double-page spreads of the processing-target album being set to a number larger than or equal to the total number of double-page spreads at S51103, the processing advances to S1305.

At S1305, the number of double-page spreads adjustment unit 1204 performs adjustment so that the number of double-page spreads of the album becomes close to the total number of double-page spreads set at S501 by deleting unnecessary double-page spread data of the double-page spread data acquired by the double-page spread acquisition unit 1201. In the present embodiment, the number of double-page spreads is adjusted by deleting the common double-page spread data. Specifically, among the common double-page spread data located within the album, the common double-page spread data whose image capturing time of the double-page spread data calculated by the sort reference value calculation unit 1202 is the closest to the image capturing time of the individual double-page spread data is deleted. After the deletion, the processing advances to S1304. In the present embodiment, the common double-page spread data is deleted, but this is not limited. It may also be possible to adjust the total number of double-page spreads by deleting the individual double-page spread data.

At S1306, the double-page spread acquisition unit 1201 determines whether the processing at S1301 to S1305 has been completed for all the albums. In a case where determination results at this step are affirmative, the processing advances to S513 and on the other hand, in a case where the determination results are negative, the processing returns to S1301. Due to this, it is possible to arrange the images in order of the image capturing time throughout the entire album. The above is the contents of the automatic layout processing in the present embodiment.

By the processing in FIG. 13, it is made possible to make the same the total number of pages of all the albums. Further, by the processing in FIG. 13, it is made possible for the number of individual pages to be different in all the albums. Furthermore, by the processing in FIG. 13, it is made possible for the number of common pages to be different in all the albums. In the following, specific explanation is given. For example, it is assumed that 20 is set as the total number of pages in accordance with the setting of a user. Further, it is assumed that the number of individual double-page spreads at the time of the individual parameter of the album 1 being set is calculated as five by equation (6) and the number of individual double-page spreads at the time of the individual parameter of the album 2 being set is calculated as ten by equation (6). In this case, the number of common double-page spreads is calculated as 15 at S51105. In a case where the processing in FIG. 13 is performed for creating the album 1 in this situation, the double-page spread data whose number of double-page spreads created with the common parameter is 15 and the double-page spread data whose number of double-page spreads created with the individual parameter of the album 1 is five are acquired at S1301. In this case, determination results at S1304 are Yes. Because of this, the layout information for generating an album whose total number of pages is 20, whose number of individual double-page spreads is five, and whose number of common double-page spreads is 15 is generated at S513. On the other hand, in a case where the album 2 is created, the double-page spread data whose number of double-page spreads created with the common parameter is 15 and the double-page spread data whose number of double-page spreads created with the individual parameter of the album 2 are ten acquired at S1301. In this case, determination results at S1304 are No. Because of this, five pieces of double-page spread data are deleted at S1305. As a result of this, the layout information for generating an album whose total number of pages is 20, whose number of individual double-page spreads is ten, and whose number of common double-page spreads is 15 is generated at S513. As described above, by the processing in FIG. 13, it is made possible for each of the number of common double-page spreads and the number of individual double-page spreads for each album (that is, for each user) to change in accordance with the image group and the setting. Due to S1303, the individual double-page spreads are arranged in a time series within the album. Further, due to S1304 and S1305, it is made possible for the page on which the individual double-page spread appears in the album to be different. For example, it is made possible for the first individual page to appear on the second double-page spread of the album 1 in the album 1 and for the first individual page to appear on the first double-page spread of the album 2 in the album 2.

In the present embodiment, the processing is performed in units of spread pages, but the processing may be performed in units of pages. That is, it may also be possible to create the "individual page" and the "common page" in units of double-page spreads (that is, two pages) or create the "individual page" and the "common page" in units of pages.

<About Effects of the Present Embodiment>

Figure 25:
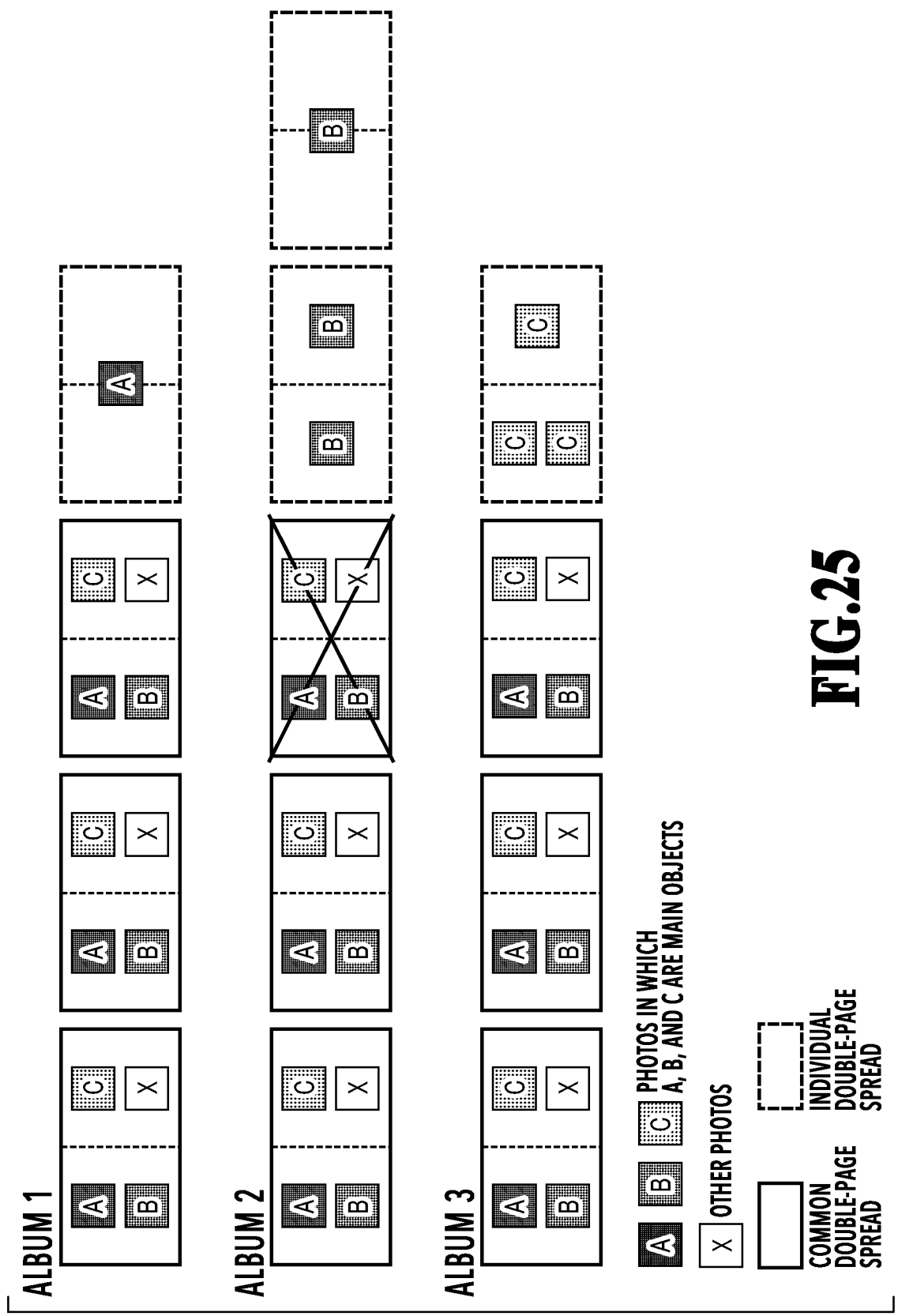
FIG. 25 is a diagram for explaining effects of the first embodiment.

FIG. 25 is a diagram for explaining effects of the present embodiment and shows examples of a plurality of variations of album created in the present embodiment. To explain in detail, FIG. 25 shows a case where the albums 1 to 3 are created as albums for objects A to C and the main object in the album 1 is set to the object A, the main object in the album 2 is set to the object B, and the main object in the album 3 is set to the object C, respectively. A common double-page spread 2901 represents a common double-page spread that is not used finally in the album 2 as a result of adjustment (NO at S1304 S1305 in FIG. 13) because the acquired number of double-page spreads exceeds the total number of double-page spreads.

As shown in FIG. 25, as regards the variations of album created in the present embodiment, the total number of double-page spreads does not change depending on the album and is constant at all times. In the example in FIG. 25, the total number of double-page spreads is four irrespective of the album.

Further, in the present embodiment, after the score of image quality and the score for each object are given for one image, the image is further re-scored based on the individual parameter. Consequently, as a result of re-scoring, the number of candidate images of the individual double-page spread changes depending on the album, and therefore, the number of individual double-page spreads may change. However, in the present embodiment, although the number of good photos varies for each object, priority is given to improvement of the degree of satisfaction of a user by using good photos for each object as much as possible. Consequently, it is permitted for the number of individual double-page spreads to change depending on the album. In the example in FIG. 25, the number of individual double-page spreads of the album 1 and the album 3 is one, but on the other hand, the number of individual double-page spreads of the album 2 is two. It is permitted also for the position of the individual double-page spread for each album to change. For example, in the album 1 in FIG. 25, the first individual double-page spread appears on the fourth double-page spread of the album, but in the album 2, the first individual double-page spread appears on the third double-page spread of the album. In the example in FIG. 25, the number of individual double-page spreads of the album 1 and the album 3 is one, but on the other hand, the number of individual double-page spreads of the album 2 is two. In each album, the individual double-page spreads are arranged in chronological order.

Further, it is permitted for the number of common double-page spreads to change depending on the album. In the example in FIG. 25, the number of common double-page spreads of the album 1 and the album 3 is three, but on the other hand, the number of common double-page spreads of the album 2 is two.

According to the present embodiment, it is made possible to automatically set the number of common double-page spreads, the number of individual double-page spreads, and the positions thereof for each album.

Second Embodiment

In the present embodiment, a double-page spread common to at least two albums and an individual double-page spread in each album are created. The total number of double-page spreads, the number of individual double-page spreads, and the positions of the individual double-page spreads for each album change in accordance with the image group and the setting. The double-page spreads and the images arranged within the double-page spread are arranged in order of the image capturing time. In the following explanation, explanation of the portions in common to those of the embodiment described previously is omitted and portions different from the embodiment described previously are explained mainly.

<About Automatic Layout Processing>

Figure 14A:
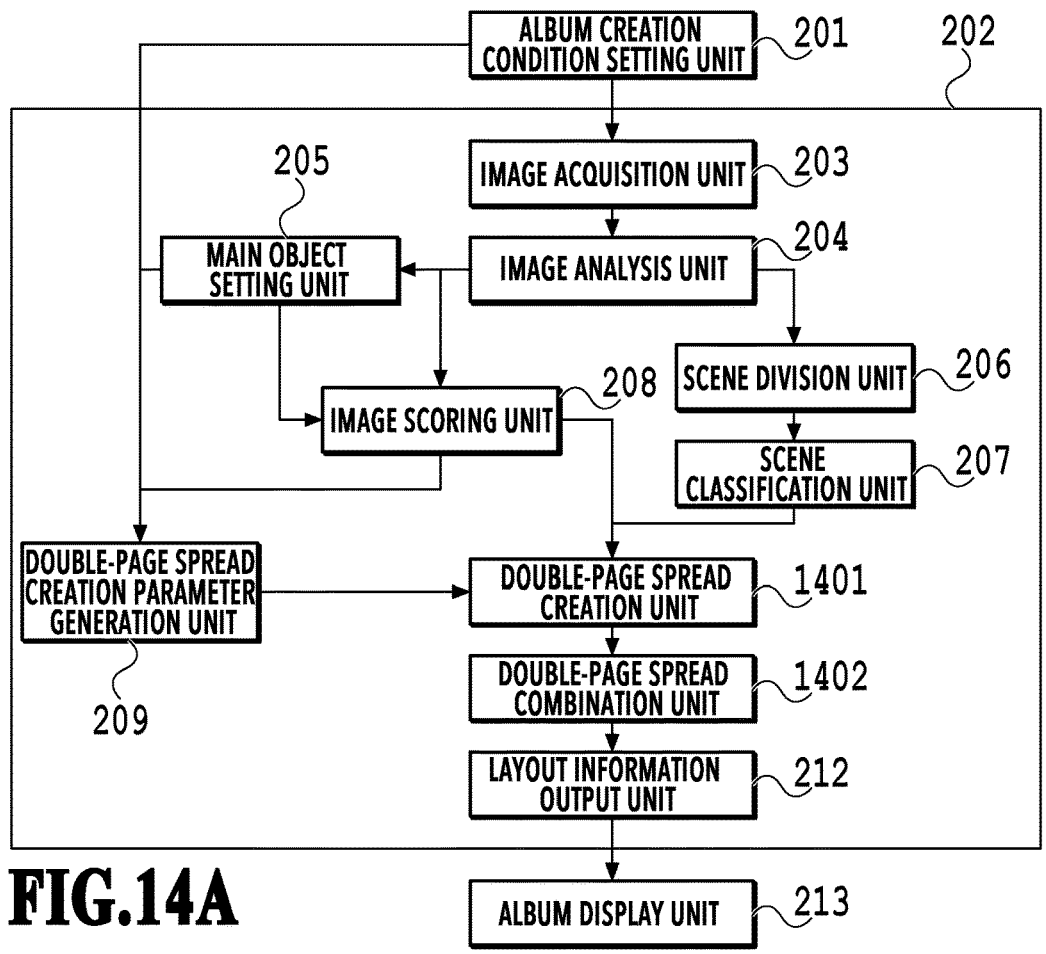
FIG. 14A and FIG. 14B are each a block diagram showing a software configuration of an image processing apparatus in a second embodiment.
Figure 14B:
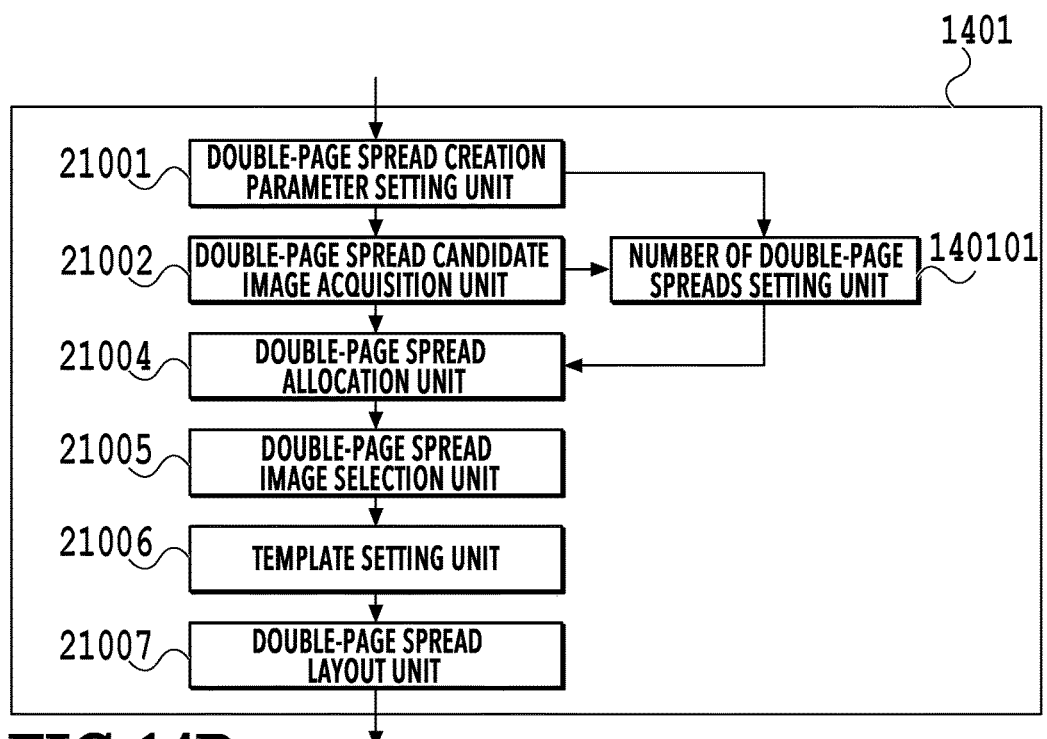
Figure 15A:
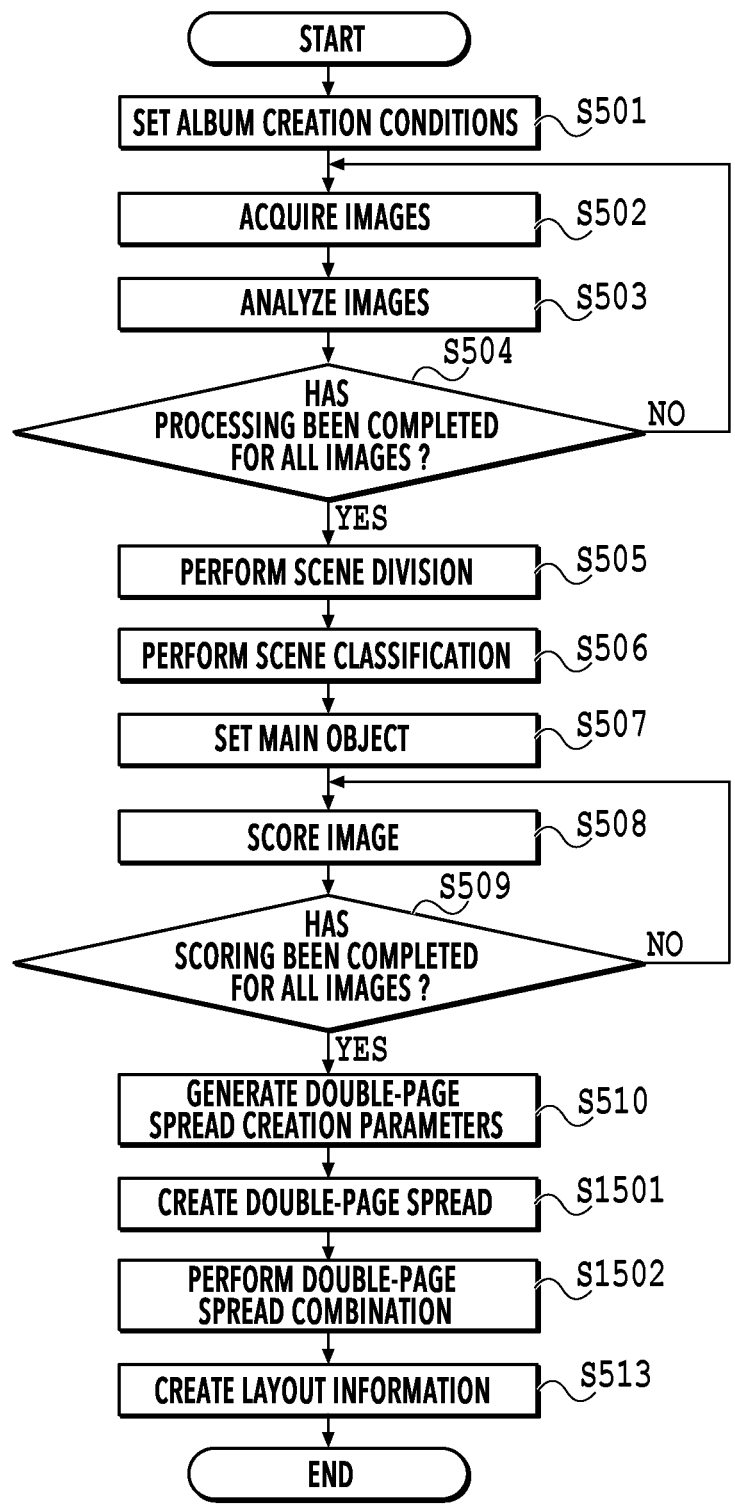

In the following, the automatic layout processing in the present embodiment is explained by using FIG. 14A, FIG. 14B, and FIG. 15A to FIG. 15C. FIG. 14A and FIG. 14B are each a block diagram showing the function configuration relating to the automatic layout processing in the present embodiment. FIG. 15A to FIG. 15C are each a flowchart for explaining the automatic layout processing in the present embodiment. The processing that is indicated by the same symbol as that of the embodiment described previously (see FIG. 5A to FIG. 5C) is the same processing as that of the embodiment described previously, and therefore, explanation is omitted here.

At S1501, a double-page spread creation unit 1401 creates a double-page spread of the album by using the parameters generated at S510. Here, double-page spread creation at this step is explained by using FIG. 15C.

At S150101, a number of double-page spreads setting unit 140101 sets the number of double-page spreads based on the results of the scene division performed at S505 and the candidate images acquired at S51102. In the present embodiment, the number of double-page spreads is set in accordance with equation (9) and equation (10) below.

[Equation 9]

$$\text{number of double-page spreads for each scene} = \text{ceil}(\text{number of candidate images in scene} \div \text{maximum number of images per double-page spread}) \quad \text{equation (9)}$$

[Equation 10]

$$\text{number of double-page spreads} = \Sigma \text{number of double-page spreads for each scene} \quad \text{equation (10)}$$

By equation (9) and equation (10), it is possible to set the number of double-page spreads in accordance with the number of images in which the main object is captured frequently for each scene.

Figure 16:
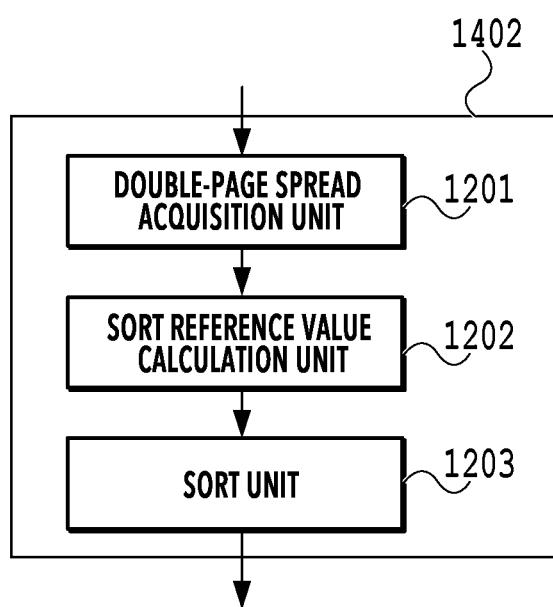
FIG. 16 is a detailed block diagram of a double-page spread combination unit in the second embodiment.
Figure 17:
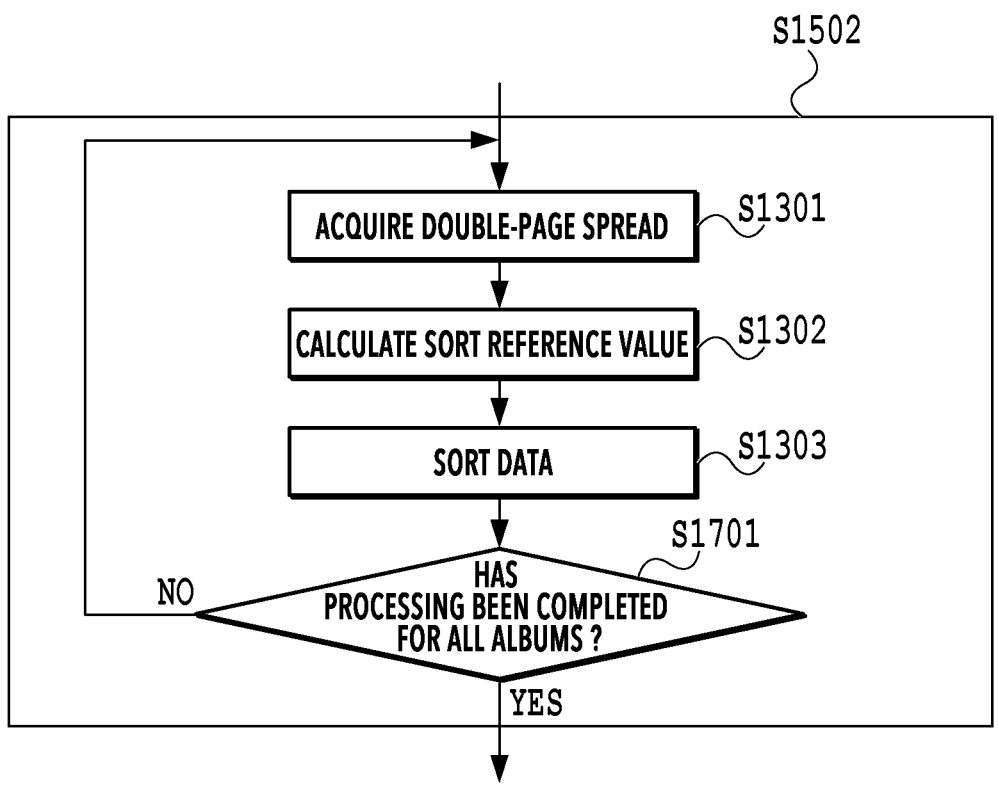
FIG. 17 is a flowchart of double-page spread combination processing in the second embodiment.

At S1502, a double-page spread combination unit 1402 determines the double-page spread number within the album for each double-page spread created by the double-page spread creation unit 1401 and creates the layout of the entire album. In the present embodiment, based on the image capturing times of the images arranged on the double-page spread, the double-page spreads are arranged so that the images are arranged in order of the image capturing time. In the following, double-page spread combination at S1502 is explained in detail by using FIG. 16 and FIG. 17. FIG. 16 is a block diagram showing a detailed configuration of the double-page spread combination unit 1402 in the present embodiment. FIG. 17 is a flowchart of processing performed by the double-page spread combination unit 1402.

At S1301, the double-page spread acquisition unit 1201 acquires double-page spreads relating to one album among the double-page spread data created by the double-page spread creation unit 1401. In the present embodiment, the double-page spreads relating to the album 1, which are acquired at this step, include, for example, the double-page spread data created with the common parameter and the double-page spread data created with the individual parameter of the album 1.

At S1302, the sort reference value calculation unit 1202 calculates the image capturing time representing each piece of double-page spread data for each piece of double-page spread data acquired by the double-page spread acquisition unit 1201. In the present embodiment, it is assumed that the image capturing time representing the double-page spread data is the average of the image capturing times of the images arranged on the double-page spread.

At S1303, the sort unit 1203 sorts the double-page spread data acquired by the double-page spread acquisition unit 1201 based on the image capturing time of the double-page spread, which is calculated by the sort reference value calculation unit 1202. In the present embodiment, the double-page spread data is arranged in ascending order from the double-page spread data whose image capturing time is the earliest.

At S1701, the double-page spread acquisition unit 1201 determines whether the processing at S1301 to S1303 has been completed for all the albums. In a case where determination results at this step are affirmative, the processing advances to S513 and on the other hand, in a case where the determination results are negative, the processing returns to S1301. Due to this, it is possible to arrange the images in order of the image capturing time throughout the entire album. The above is the contents of the automatic layout processing in the present embodiment.

By the processing in FIG. 17, it is made possible for the total number of pages to be different in all the albums. Further, by the processing in FIG. 17, it is made possible for the number of individual pages to be different in all the albums. Furthermore, by the processing in FIG. 17, it is made possible for the number of common pages to be the same in all the albums. In the following, specific explanation is given. For example, it is assumed that the number of individual double-page spreads at the time of the individual parameter of the album 1 being set is calculated as five by equation (10) and the number of individual double-page spreads at the time of the individual parameter of the album 2 being set is calculated as ten by equation (10). Further, it is assumed that the number of common double-page spreads at the time of the common parameter being set at S51101 is calculated as seven by equation (10). In a case where the processing in FIG. 17 is performed for creating the album 1 in this situation, at S1303, the individual pages and the common pages are sorted based on the image capturing time and the layout information is generated. That is, the layout information in which the number of individual double-page spreads is five and the number of common double-page spreads is seven is generated. On the other hand, in a case where the album 2 is created, the layout information in which the number of individual double-page spreads is ten and the number of common double-page spreads is seven is generated. Further, by S1303, it is made possible for the page on which the individual double-page spread appears in the album to be different.

In the present embodiment, the processing is performed in units of spread pages, but the processing may be performed in units of pages. That is, it may also be possible to create the "individual page" and the "common page" in units of double-page spreads (that is, two pages) or create the "individual page" and the "common page" in units of pages.

<About Effects of the Present Embodiment>

Figure 26B:
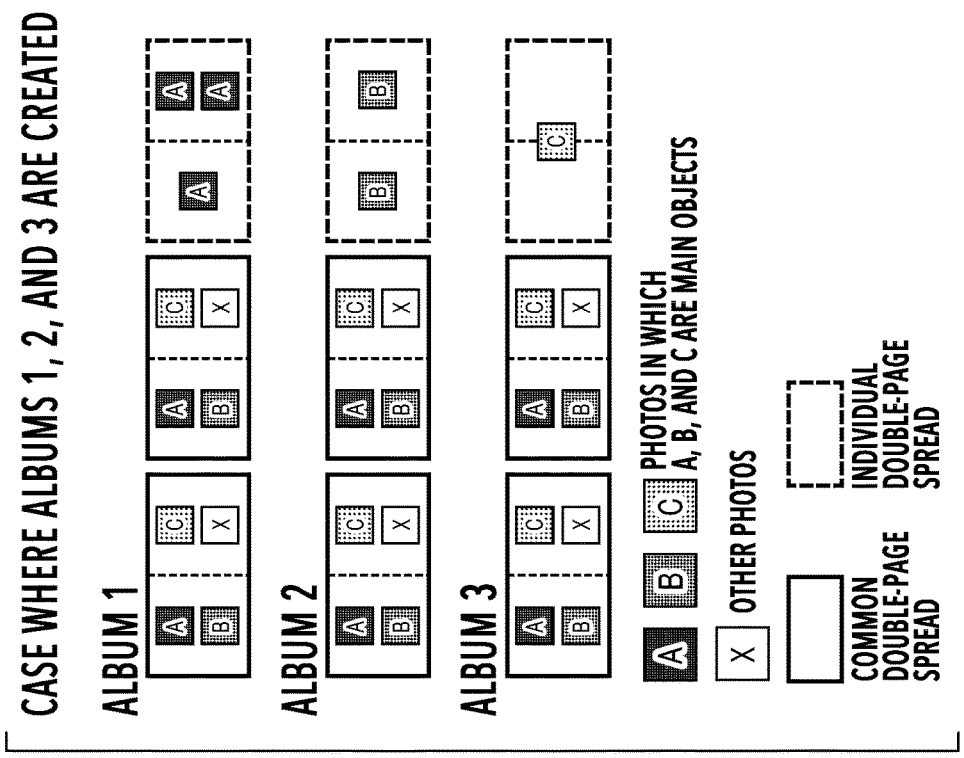
FIG. 26A and FIG. 26B are diagrams for explaining effects of the second embodiment.
Figure 26A:
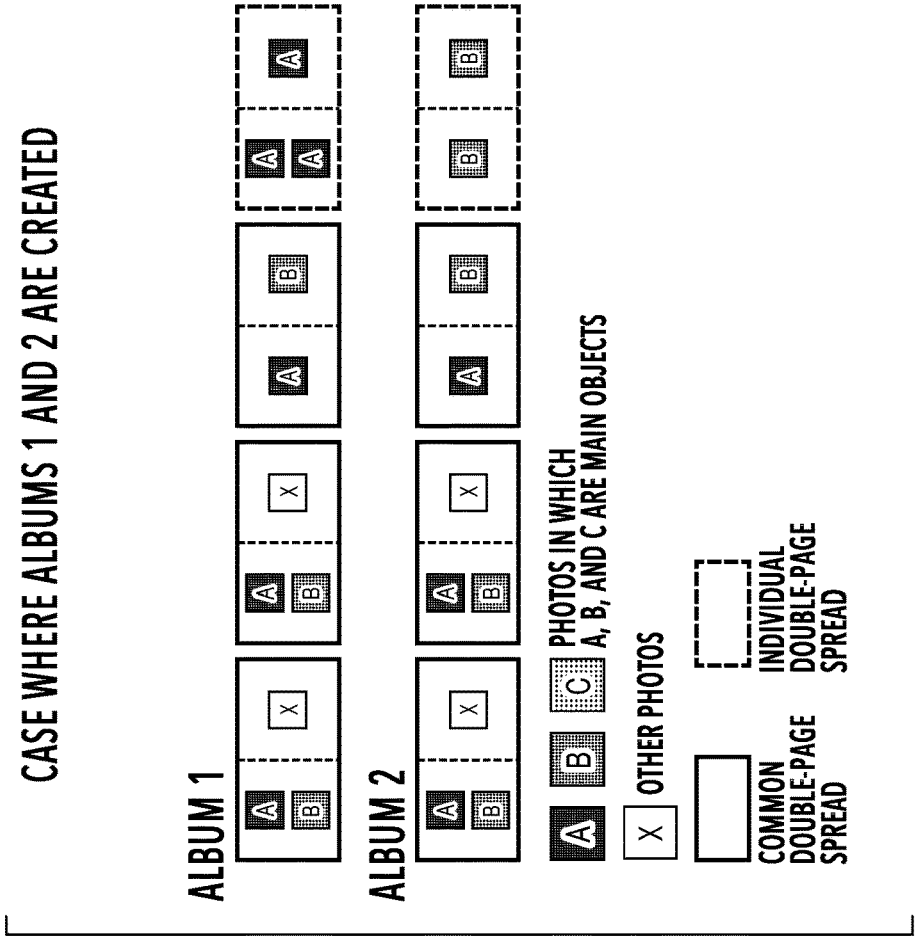

FIG. 26A and FIG. 26B are diagrams for explaining effects of the present embodiment and show examples of a plurality of variations of album created in the present embodiment. To explain in detail, FIG. 26A shows a case where the albums 1 and 2 are created as albums for the objects A and B and the main object in the album 1 is set to the object A and the main object in the album 2 is set to the object B. Further, FIG. 26B shows a case where the albums 1 to 3 are created as albums for the objects A to C and the main object in the album 1 is set to the object A, the main object in the album 2 is set to the object B, and the main object in the album 3 is set to the object C, respectively.

In the present embodiment, different from the first embodiment, the restriction that the total number of double-page spreads be the same in a plurality of albums is removed. The reason is that in the present embodiment, the number of photos is not limited and priority is given to improvement of the degree of satisfaction of a user by using good photos as much as possible. Consequently, as regards the variations of album to be created, it is permitted for the total number of double-page spreads to be different depending on the album. In the example in FIG. 26A, the total number of double-page spreads is four by chance irrespective of the album and in the example in FIG. 26B, the total number of double-page spreads is three irrespective of the album. That is, the examples are shown in which the total number of double-page spreads is the same in the plurality of albums, but for example, in FIG. 26A, in a case where the number of individual double-page spreads of the object A of the album 1 is two, the total number of double-page spreads is different between the album 1 and the album 2.

Further, in the present embodiment, as described above, priority is given to improvement of the degree of satisfaction of a user by using good photos as much as possible. Consequently, it is permitted for the number of individual double-page spreads to be different depending on the album. In the example in FIG. 26A, the number of individual double-page spreads of the album 1 and the album 2 is one and in the example in FIG. 26B, the number of individual double-page spreads of the albums 1 to 3 is one, and both the examples show the results in which the number of individual double-page spreads is the same by chance in all the albums. However, for example, in a case where the number of individual double-page spreads of the object A of the album 1 is two in FIG. 26A, the number of individual double-page spreads is different between the album 1 and the album 2.

Further, as described above, in the present embodiment, the position of the individual double-page spread for each album may change. The example in FIG. 26A shows the results of a case where the position of the individual double-page spread is the same by chance (that is, the fourth double-page spread of the album). However, for example, in a case where the average image capturing date of the individual double-page spread of the object A of the album 1 is earlier than any of the average image capturing dates of all the common double-page spreads, the individual double-page spread is arranged at the position of the first double-page spread of the album.

Further, in the present embodiment, different from the first embodiment, the restriction that the total number of double-page spreads be the same in the plurality of albums is removed. Because of this, there is no step of deleting the common double-page spread in a case where the total number of double-page spreads is exceeded. Consequently, in the present embodiment, the number of common double-page spreads does not change depending on the album and is the same at all times. As shown in FIG. 26A, the number of common double-page spreads of the album 1 and the album 2 is three. Further, as shown in FIG. 26B, the number of common double-page spreads of the albums 1 to 3 is two.

According to the present embodiment, it is made possible to automatically set the total number of double-page spreads, the number of individual double-page spreads, and the positions thereof of the album for each album.

Third Embodiment

In the present embodiment, a double-page spread common to at least two albums and an individual double-page spread in each album are created. The number of common double-page spreads and the number of individual double-page spreads are made the same for all the albums. However, it is permitted for the position of the individual double-page spread to change for each album in accordance with the image group and the setting. The double-page spreads and the images that are arranged within the double-page spread are arranged in order of the image capturing time. In the following explanation, explanation of the portions in common to those of the embodiment described previously is omitted and portions different from the embodiment described previously are explained mainly.

<About Automatic Layout Processing>

Figure 18A:
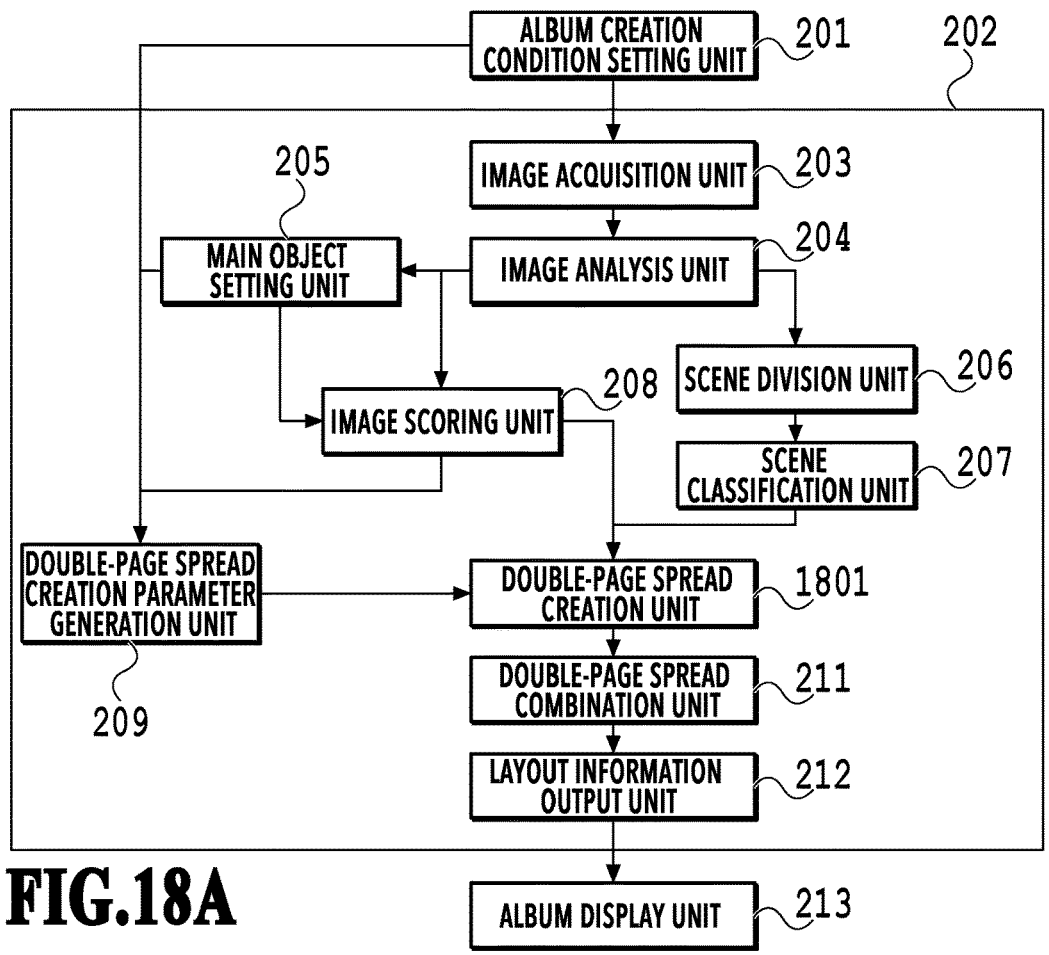
FIG. 18A and FIG. 18B are each a block diagram showing a software configuration of an image processing apparatus in a third embodiment.
Figure 18B:
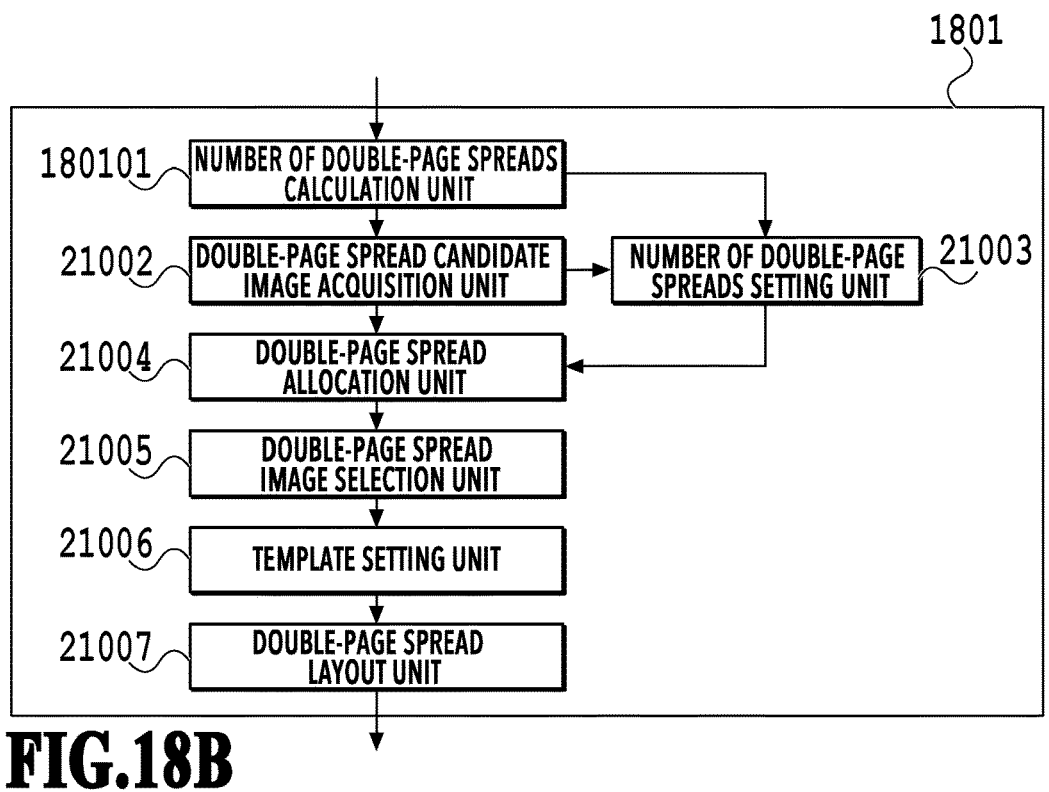
Figure 19A:
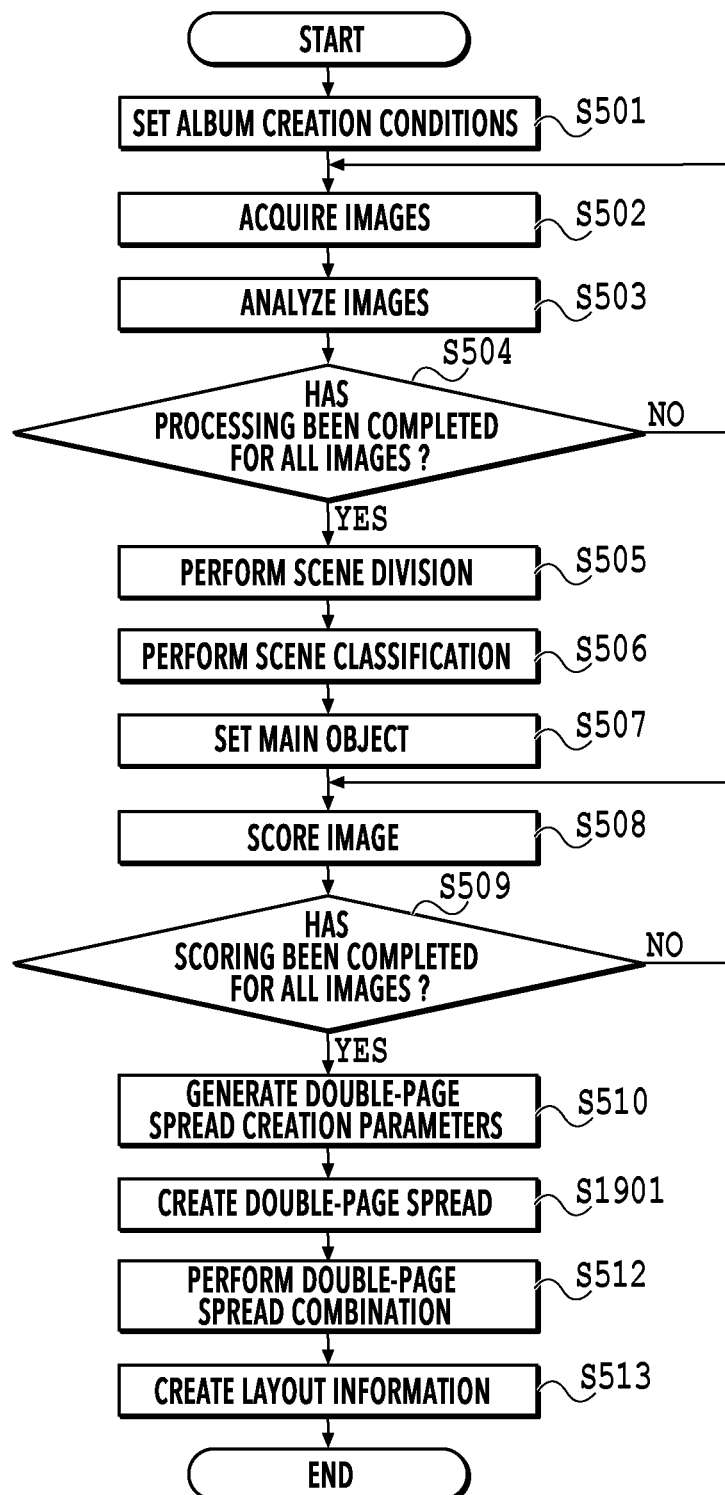

In the following, the automatic layout processing in the present embodiment is explained by using FIG. 18A, FIG. 18B, and FIG. 19A to FIG. 19C. FIG. 18A and FIG. 18B are each a block diagram showing the function configuration relating to the automatic layout processing in the present embodiment. FIG. 19A to FIG. 19C are each a flowchart for explaining the automatic layout processing in the present embodiment. The processing that is indicated by the same symbol as that of the embodiment described previously is the same processing as that of the embodiment described previously, and therefore, explanation is omitted here.

At S1901, a double-page spread creation unit 1801 creates double-page spread data of the album by using the parameters generated at S510. Here, double-page spread data creation processing at this step is explained by using FIG. 19C.

Figure 20:
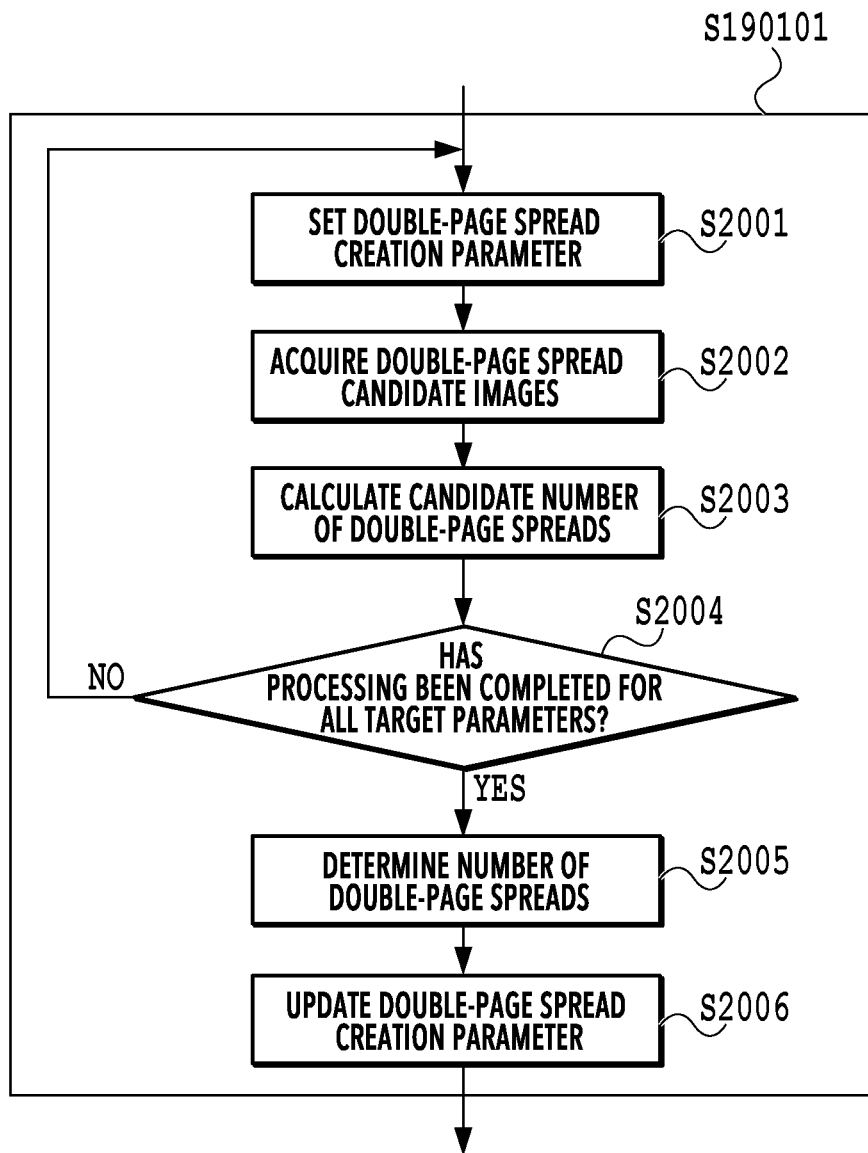
FIG. 20 is a flowchart of number of double-page spreads calculation processing in the third embodiment.

At S190101, a number of double-page spreads calculation unit 180101 calculates the number of double-page spreads created with each double-page spread creation parameter based on the parameters generated at S510 and updates each double-page spread creation parameter, specifically, sets the calculated number of double-page spreads to each double-page spread creation parameter. In the following, processing performed by the number of double-page spreads calculation unit 180101 in the present embodiment is explained by using FIG. 20.

At S2001, the double-page spread creation parameter setting unit 21001 reads one parameter that makes the same the number of double-page spreads among the parameters generated at S510. In the present embodiment, the individual parameter of the album 1 and the individual parameter of the album 2 are read in order. In the processing in FIG. 20, the common parameter is not read.

At S2002, the double-page spread candidate image acquisition unit 21002 acquires candidate images by the same method as that at S51102 based on the score given at S508 and the double-page spread creation parameter set at S2001.

At S2003, the number of double-page spreads calculation unit 180101 calculates the candidate number of individual double-page spreads based on the candidate images acquired at S2002. In the present embodiment, the candidate number of individual double-page spreads is calculated in accordance with equation (11) below.

[Equation 11]

candidate number of individual double-page spreads=ceil (number of candidate images÷maximum number of images per double-page spread)     equation (11)

The candidate number of individual double-page spreads calculated by using equation (11) increases or decreases according to the number of candidate images.

At S2004, the number of double-page spreads calculation unit 180101 determines whether the processing at S2001 to S2003 has been completed for all the target parameters that make the same the number of double-page spreads. In a case where determination results at this step are affirmative, the processing advances to S2005 and on the other hand, in a case where the determination results are negative, the processing returns to S2001.

At S2005, the number of double-page spreads calculation unit 180101 determines the number of double-page spreads based on a candidate number of individual double-page spreads group calculated at S2003. In the present embodiment, the smallest number of double-page spreads is selected from among the candidate numbers of individual double-page spreads. For example, in a case where the number of double-page spreads calculated with the individual parameter of the album 1 is five and the number of double-page spreads calculated with the individual parameter of the album 2 is two, two is selected. Due to this, it is possible to create the same number of individual double-page spreads in accordance with the parameter with a small number of candidate images. Further, the number of common double-page spreads created with the common parameter is determined subordinately based on the number of individual double-page spreads created with the individual parameter and the total number of double-page spreads set at S501 as indicated by equation (12) below.

[Equation 12]

number of common double-page spreads=total number of double-page spreads−number of individual double-page spreads     equation (12)

That is, for example, in a case where the total number of double-page spreads is 20 and the number of individual double-page spreads set at S2005 is two as described above, the number of common double-page spreads is 18. In the example described above, the number of common double-page spreads is applied to both the album 1 and the album 2, and therefore, the number of common double-page spreads is the same in all the albums.

At S2006, the number of double-page spreads calculation unit 180101 updates the double-page spread creation parameter by adding the number of double-page spreads determined at S2005 to the parameter generated at S510. For example, the double-page spread creation parameter is updated by using both the number of individual double-page spreads and the number of common double-page spreads.

As described above, at S190101, the number of individual double-page spreads and the number of common double-page spreads are adjusted, and therefore, S1304 and S1305 at S512 may be omitted.

Explanation is returned to FIG. 19C. At S190102, a number of double-page spreads setting unit 180102 reads the number of double-page spreads set at S190101 from the double-page spread creation parameter read at S51101.

At S190103, a double-page spread allocation unit 180103 allocates the candidate images acquired at S51102 to the sub image groups corresponding to the number of double-page spreads set at S190102. Then, in the present embodiment, further, from the sub image groups to which the candidate images are allocated, the sub image groups corresponding to the number of double-page spreads included in the double-page spread creation parameter set at the immediately previous S51101 are selected in order from the highest average of the image score. Explanation is given based on the example described above. As described above, for example, it is assumed that two is set as the number of individual double-page spreads. On the other hand, the number of double-page spreads calculated with the individual parameter of the album 1 is five. Because of this, in a case where the individual parameter of the album 1 is set at S51101, the double-page spread allocation unit 180103 generates five sub image groups and selects two sub image groups whose average of the image score is the highest and the second highest. In a case where the individual parameter of the album 2 is set at S51101, the double-page spread allocation unit 180103 generates two sub image groups. Because of this, the two sub image groups are selected as they are. That is, by this processing, the number of individual double-page spreads is made the same in all the albums. In the present embodiment, as described above, the number of common double-page spreads and the number of individual double-page spreads are the same, and therefore, the total number of pages is also the same. In the present embodiment, although not described in detail, after S1901 in FIG. 19C, S512 described above is performed. As a result of that, the sort unit 1203 sorts the double-page spread data of the individual double-page spread and the double-page spread data of the common double-page spread acquired by the double-page spread acquisition unit 1201 based on the sort reference value calculated by the sort reference value calculation unit 1202. In the present embodiment, the double-page spreads are arranged in ascending order from the double-page spread whose average image capturing time is the earliest. Consequently, the individual double-page spreads are arranged in a time series along the image capturing time within the album. Further, the double-page spread data of the individual double-page spread and the double-page spread data of the common double-page spread are sorted in units of albums, and therefore, it is made possible for the page on which the individual double-page spread appears in the album to be different.

In the present embodiment, the number of double-page spreads is set in accordance with the number of candidate images, but the method of setting the number of candidate images is not limited to this. For example, it may also be possible to set the number of individual double-page spreads and the number of common double-page spreads by a ratio incorporated in advance in the program of the album creation application. Specifically, in a case where the number of individual double-page spreads:the number of common double-page spreads=1:4 is set, on a condition that the total number of double-page spreads set at S501 is ten, the number of individual double-page spreads is set to two and the number of common double-page spreads is set to eight. Further, as another example, it may also be possible to determine the number of double-page spreads by the scene classification results at S506. For example, a case is considered where the scene classification results is the wedding. It may also be possible to set a plurality of the numbers of individual double-page spreads in accordance with the scene, such as a total of ten double-page spreads, that is, two double-page spreads with the individual parameter setting the groom and bride as the main objects, one double-page spread with the individual parameter setting relatives or friends as the main objects, and seven double-page spreads with the common parameter. In the example described above, it may also be possible for the number of double-page spreads calculation unit 180101 to increase or decrease the threshold value for acquiring candidate images so as to match with the number of double-page spreads, in addition to the number of double-page spreads. For example, a case is considered where it is desired to create two or more double-page spreads although only one candidate image can be acquired with the double-page spread creation parameter acquired at S2001. Until it is made possible for the double-page spread candidate image acquisition unit 21002 to acquire two or more candidate images, the threshold value of the score, which is the selection reference, is reduced. The double-page spread creation parameter is updated by adding the changed threshold value to the parameter generated at S510 as in the case with the number of double-page spreads. Due to this, it is possible to acquire candidate images in accordance with the number of double-page spreads requested by a user. The above is the contents of the automatic layout processing in the present embodiment. In the present embodiment, the processing is performed in units of spread pages, but the processing may be performed in units of pages. That is, it may also be possible to create the "individual page" and the "common page" in units of double-page spreads (that is, two pages) or create the "individual page" and the "common page" in units of pages.

<About Effects of the Present Embodiment>

Figure 27B:
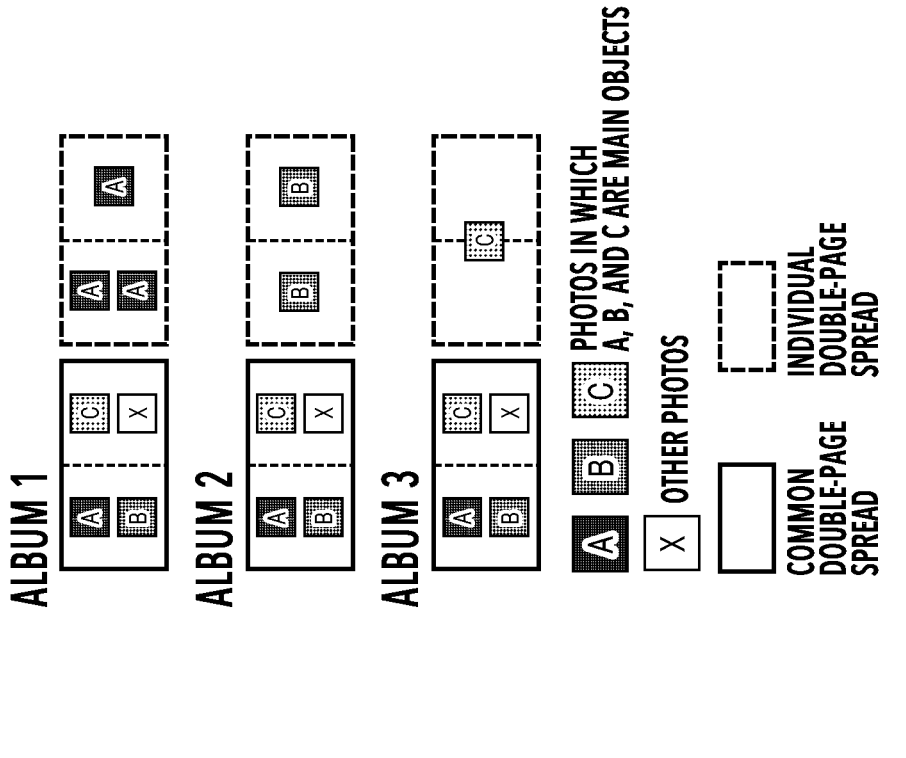
FIG. 27A and FIG. 27B are diagrams for explaining effects of the third embodiment.
Figure 27A:
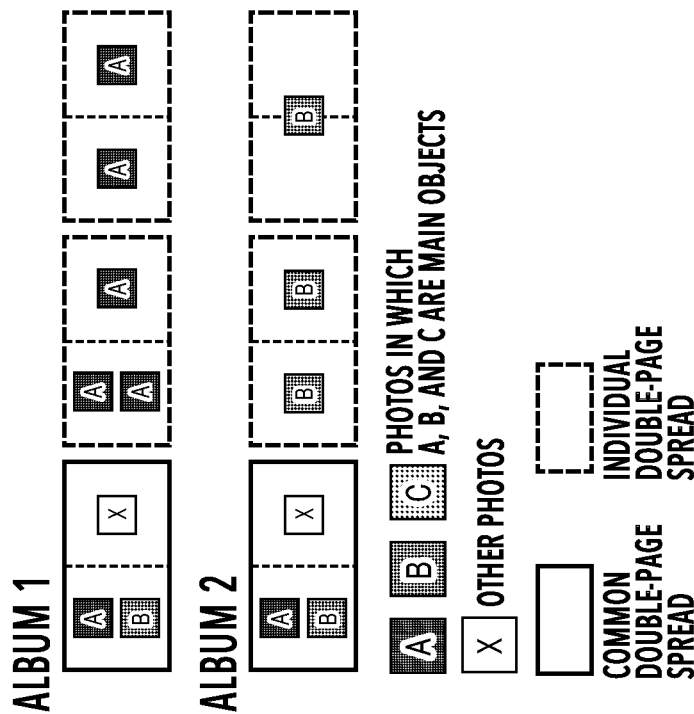

FIG. 27A and FIG. 27B are diagrams for explaining effects of the present embodiment and show examples of a plurality of variations of album created in the present embodiment. To explain in detail, FIG. 27A shows a case where the albums 1 and 2 are created as albums for the objects A and B and the main object in the album 1 is set to the object A and the main object in the album 2 is set to the object B. Further, FIG. 27B shows a case where the albums 1 to 3 are created as albums for the objects A to C and the main object in the album 1 is set to the object A, the main object in the album 2 is set to the object B, and the main object in the album 3 is set to the object C, respectively.

In the present embodiment, as regards the variations of album to be created, the total number of double-page spreads does not change depending on the album and is the same at all times. The reason is to eliminate a sense of unfairness resulting from the total number of double-page spreads varying for each album. In the example in FIG. 27A, the total number of double-page spreads is three irrespective of the album and in the example in FIG. 27B, the total number of double-page spreads is two irrespective of the album.

Further, in the present embodiment, for example, the album is created in accordance with the smallest number of double-page spreads among the candidate numbers of individual double-page spreads. Consequently, the number of individual double-page spreads does not change depending on the album and is the same at all times. Due to this, it is possible to eliminate a sense of unfairness resulting from the number of individual double-page spreads varying for each album. In the example in FIG. 27A, the number of individual double-page spreads of the album 1 and the album 2 is two and in the example in FIG. 27B, the number of individual double-page spreads of the albums 1 to 3 is one.

Further, in the present embodiment, it is also permitted for the position of the individual double-page spread for each album to change. The examples in FIG. 27A and FIG. 27B show the results of a case where the position of the individual double-page spread is the same by chance in all the albums.

According to the present embodiment, it is made possible to make the same the total number of double-page spreads, the number of common double-page spreads, and the number of individual double-page spreads in all the albums.

Fourth Embodiment

In the present embodiment, a double-page spread common to at least two albums and an individual double-page spread in each album are created. The number of common double-page spreads, the positions of the common double-page spreads, the number of individual double-page spreads, and the positions of the individual double-page spreads are made the same in all the albums. The common double-page spreads and the images that are arranged within the double-page spread are arranged in order of the image capturing time. The position of the individual double-page spread is determined by the image irrespective of the image capturing time. In the following explanation, explanation of the portions in common to those of the embodiment described previously is omitted and portions different from the embodiment described previously are explained mainly.

<About Automatic Layout Processing>

Figure 21A:
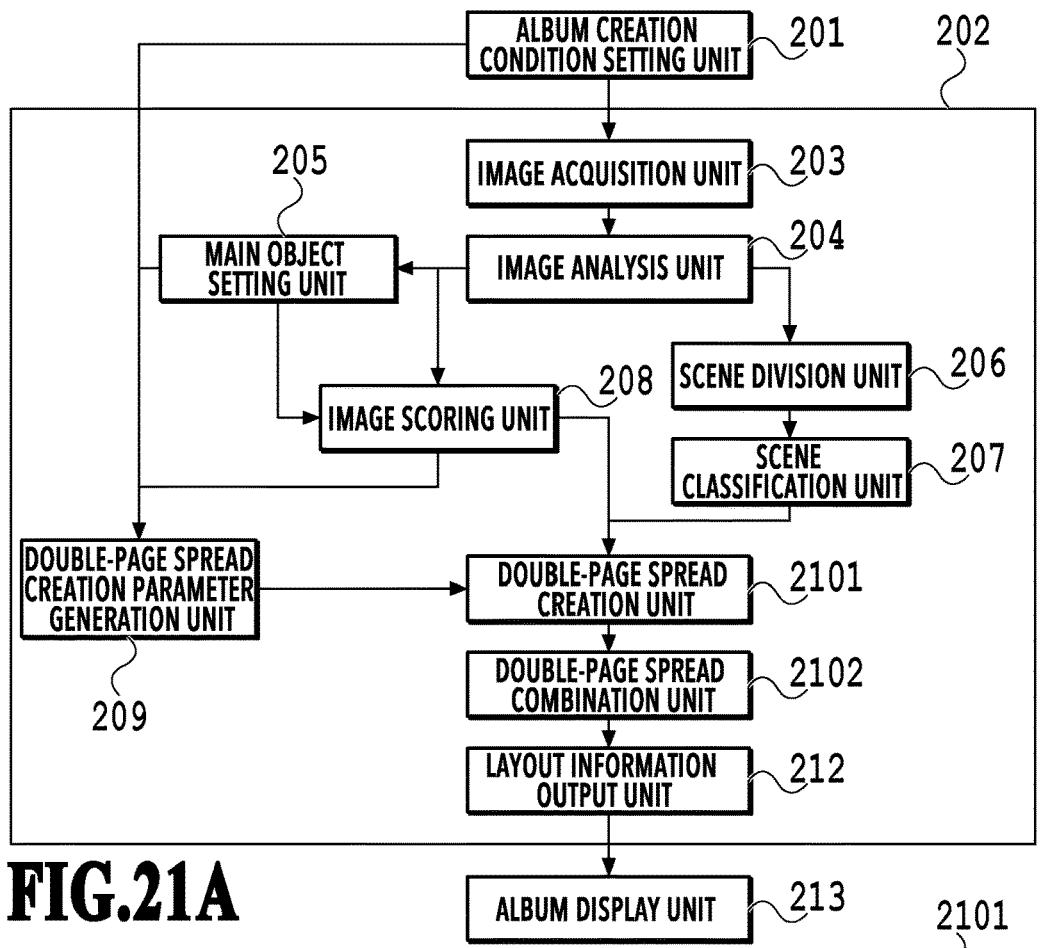
FIG. 21A and FIG. 21B are each a block diagram showing a software configuration of an image processing apparatus in a fourth embodiment.
Figure 21B:
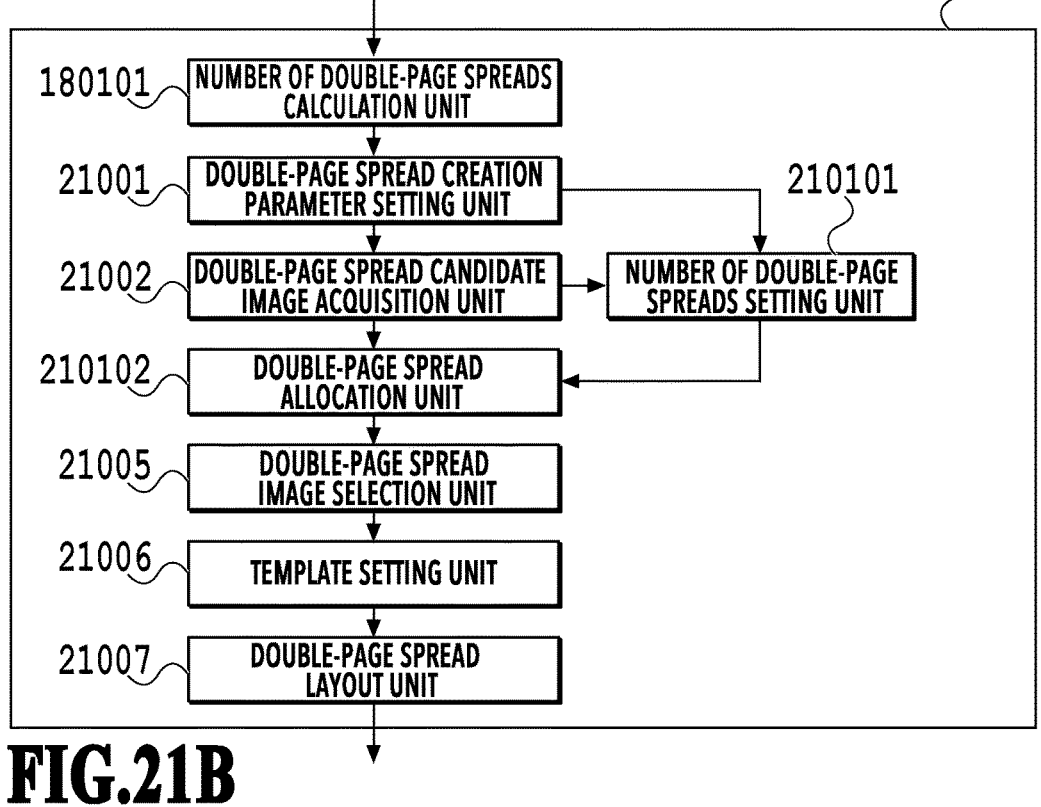
Figure 22A:
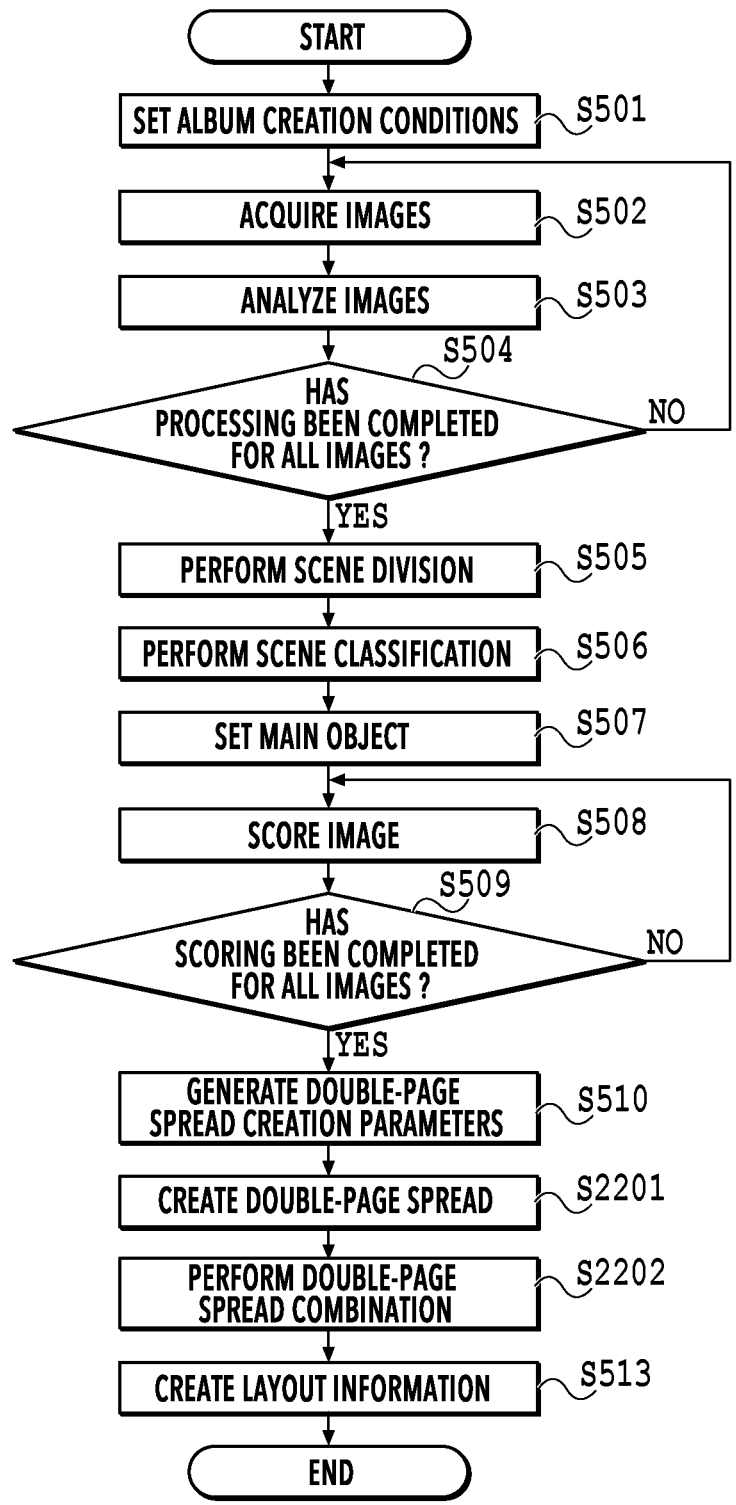

In the following, the automatic layout processing in the present embodiment is explained by using FIG. 21A, FIG. 21B, and FIG. 22A to FIG. 22C. FIG. 21A and FIG. 21B are each a block diagram showing the function configuration relating to the automatic layout processing in the present embodiment. FIG. 22A to FIG. 22C are each a flowchart for explaining the automatic layout processing in the present embodiment. The processing that is indicated by the same symbol as that of the embodiment described previously is the same processing as that of the embodiment described previously, and therefore, explanation is omitted here.

At S2201, a double-page spread creation unit 2101 creates a double-page spread of the album by using the parameters generated at S510. Here, double-page spread creation processing at this step is explained by using FIG. 22C.

At S220101, a number of double-page spreads setting unit 210101 reads the number of double-page spreads set at S190101 from the double-page spread creation parameter read at S51101.

At S220102, a double-page spread allocation unit 210102 divides the candidate images acquired at S51102 into sub image groups corresponding to the number of double-page spreads set at S220101 and allocates the sub image groups. In the present embodiment, in a case where the double-page spread creation parameter set at the immediately previous S51101 is the common parameter, the candidate images are divided based on the image capturing time acquired at S50301. On the other hand, in a case where the double-page spread creation parameter set at the immediately previous S51101 is the individual parameter, the candidate images are divided based on the score given at S508.

Specifically, in a case where the double-page spread creation parameter set at the immediately previous S51101 is the common parameter, the candidate images are arranged in order of the image capturing time acquired at S50301 and the candidate images are divided at the position where the time difference between adjacent images is the largest. The division processing such as this is performed until the candidate images are divided into sub image groups corresponding to the number of double-page spreads set at S220101. That is, the division is performed (the number of double-page spreads−1) times. Due to this, it is possible to create an album in which the images are arranged in order of the image capturing time. As will be described later, within one double-page spread, the images do not need to be arranged in order of the image capturing time.

Further, in a case where the double-page spread creation parameter set at the immediately previous S51101 is the individual parameter, the candidate images are allocated to each double-page spread in order from the candidate image whose score is the highest. For example, in a case where the number of double-page spreads is three, the candidate images are allocated to double-page spread 1, double-page spread 2, double-page spread 3, double-page spread 1, double-page spread 2, . . . , and so on, in order from the candidate image whose score is the highest. Due to this, as a result of the images whose score is high being equally allocated to each double-page spread, it is possible to arrange the images suitable for the main objects in a balanced manner, not in a time series.

Explanation is returned to FIG. 22A. At S2202, a double-page spread combination unit 2102 determines the double-page spread number within the album for each double-page spread created by the double-page spread creation unit 2101 and creates the layout of the entire album. In the present embodiment, the common double-page spreads created based on the image capturing time are arranged in order of the image capturing time. On the other hand, the individual double-page spread created based on the score is inserted at the position where the time difference between common double-page spreads is large.

Figure 23:
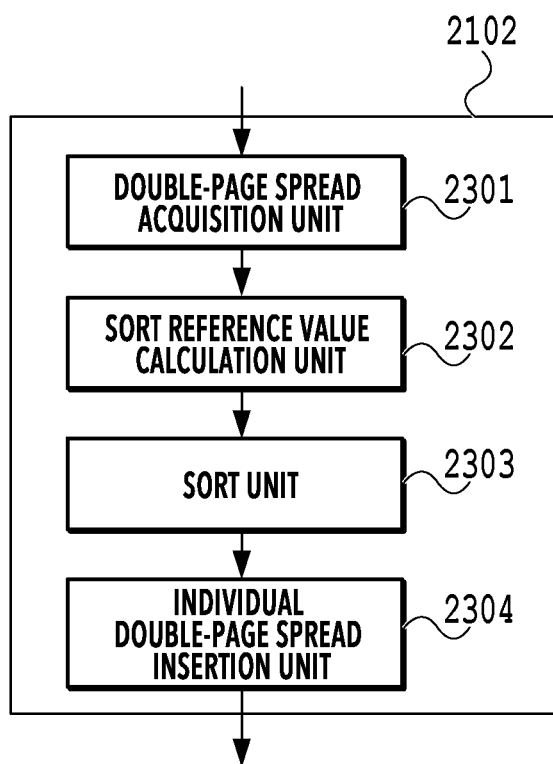
FIG. 23 is a detailed block diagram of a double-page spread combination unit in the fourth embodiment.
Figure 24:
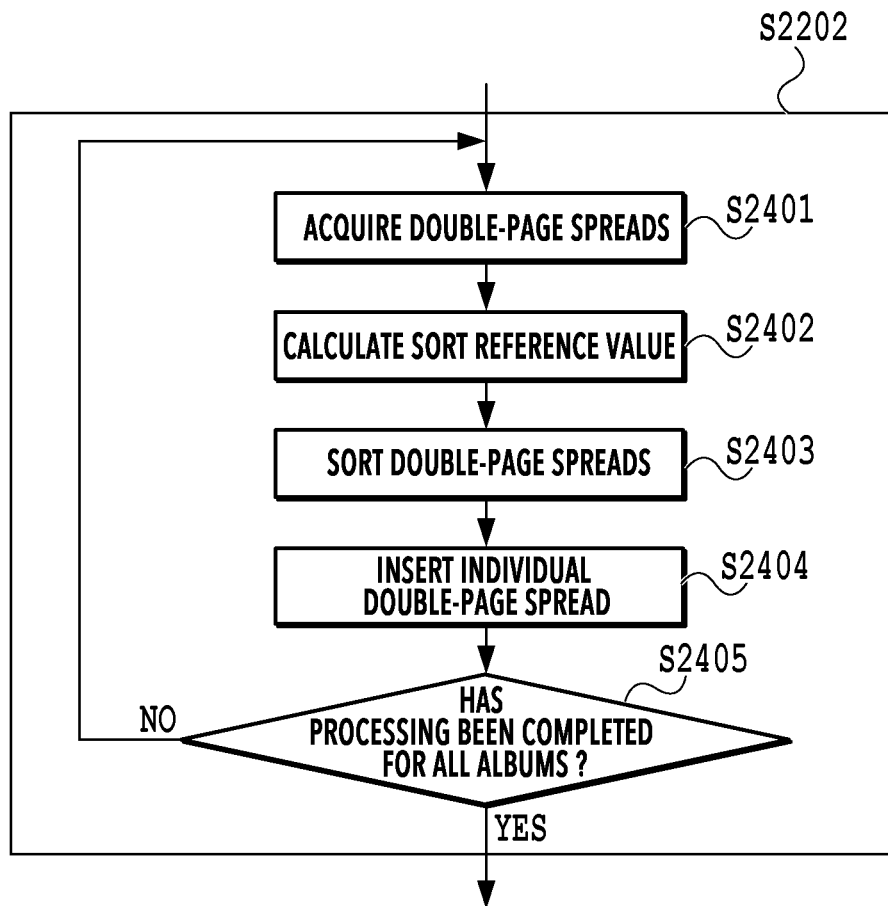
FIG. 24 is a flowchart of double-page spread combination processing in the fourth embodiment.

In the following, double-page spread combination at S2202 is explained by using FIG. 23 and FIG. 24. FIG. 23 is a block diagram showing a detailed configuration of the double-page spread combination unit 2102. FIG. 24 is a flowchart of processing performed by the double-page spread combination unit 2102.

At S2401, a double-page spread acquisition unit 2301 acquires double-page spreads relating to one album from among the double-page spreads created by the double-page spread creation unit 2101. In the present embodiment, for example, the double-page spreads relating to the album 1, which are acquired at this step, include the common double-page spread created with the common parameter and the individual double-page spread created with the individual parameter of the album 1.

At S2402, a sort reference value calculation unit 2302 calculates an image capturing time representing each double-page spread for each double-page spread acquired by the double-page spread acquisition unit 2301. In the present embodiment, the average, the minimum, and the maximum of the image capturing times of the images arranged on the double-page spread are taken as three image capturing times representing the double-page spread.

At S2403, a sort unit 2303 sorts the double-page spreads acquired by the double-page spread acquisition unit 2301 based on the image capturing time of the double-page spread, which is found by the sort reference value calculation unit 2302. In the present embodiment, the common double-page spreads are arranged in ascending order from the common double-page spread whose average of the image capturing time is the oldest.

At S2404, an individual double-page spread insertion unit 2304 determines the double-page spread number of the individual double-page spread among the double-page spreads acquired by the double-page spread acquisition unit 2301. In the present embodiment, for the common double-page spreads sorted at S2403, the individual double-page spread is inserted at the position where the image capturing time difference between common double-page spreads is the maximum. The image capturing time difference between the Nth common double-page spread and the (N+1)th common double-page spread is calculated in accordance with equation (13) below.

[Equation 13]

$$\text{minimum image capturing time of (N+1) common double-page spread} - \text{maximum image capturing time of Nth common double-page spread} \quad \text{equation (13)}$$

By equation (13), it is possible to insert the individual double-page spread at the position where the image capturing time difference is large (that is, the possibility that the scene has changed is strong). Here, the case is explained where all the individual double-page spreads are inserted between the common double-page spreads where the image capturing time difference is the maximum. By this processing, the individual double-page spreads are arranged successively in the album. The individual double-page spread insertion method is not limited to this. For example, it may also be possible to insert the individual double-page spreads at different positions, such as that the ith individual double-page spread is inserted between common double-page spreads where the image capturing time difference is the ith largest. Further, it may also be possible to insert the individual double-page spreads at the position where the common double-page spreads are not divided irrespective of the time difference, such as the position before all the common double-page spreads and the position after all the common double-page spreads.

At 2405 S2405, the double-page spread acquisition unit 2301 determines whether the processing at S2401 to S2404 has been completed for all the albums. In a case where determination results at this step are affirmative, the processing advances to S513 and on the other hand, in a case where the determination results are negative, the processing returns to S2401. Due to this, it is possible to arrange the common double-page spreads and the individual double-page spreads at the positions whose double-page spread number is the same in all the albums. The above is the contents of the automatic layout processing in the present embodiment. In the present embodiment, the processing is performed in units of spread pages, but the processing may be performed in units of pages. That is, it may also be possible to create the "individual page" and the "common page" in units of double-page spreads (that is, two pages) or create the "individual page" and the "common page" in units of pages.

<About Effects of the Present Embodiment>

Figure 28:
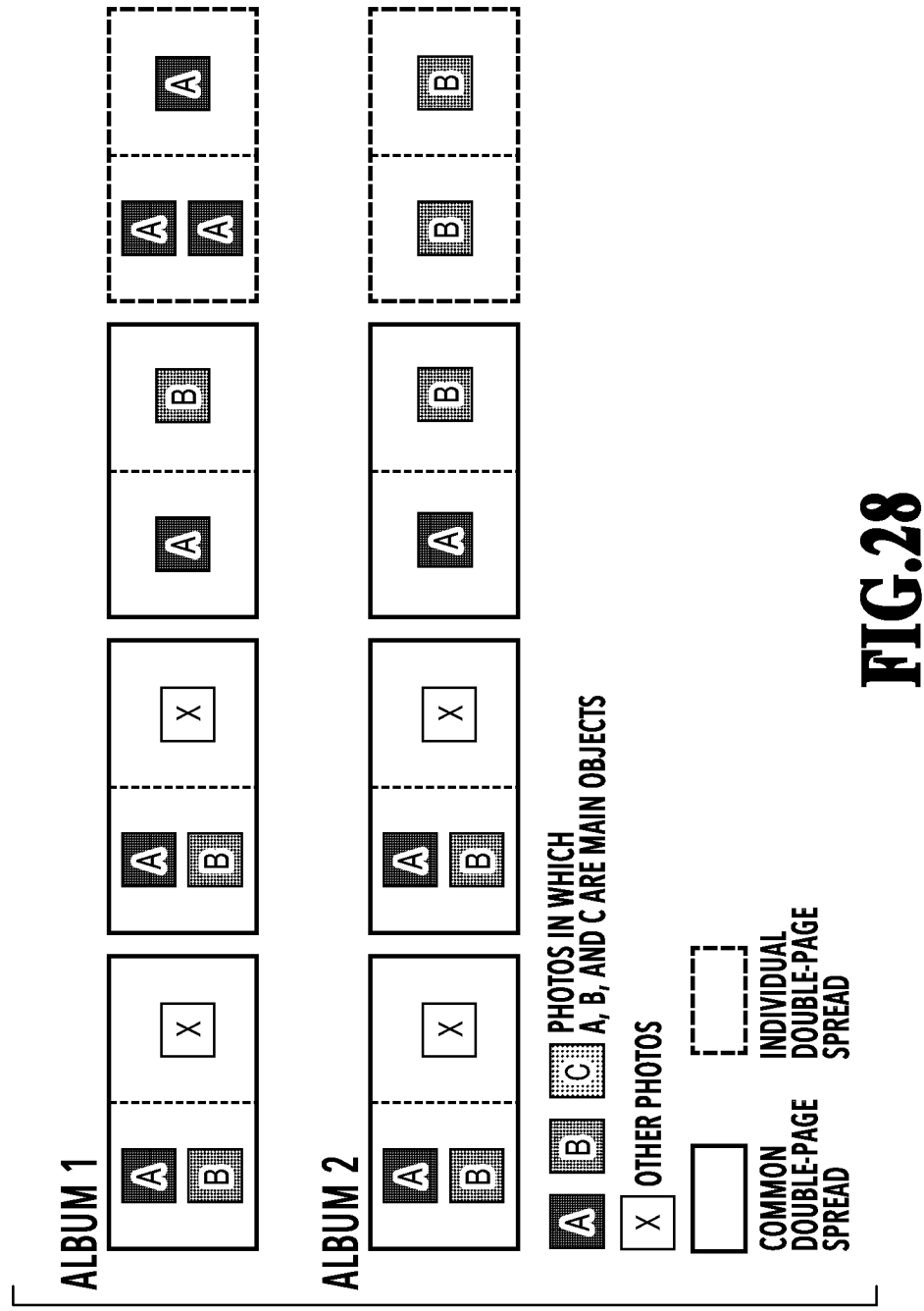
FIG. 28 is a diagram for explaining effects of the fourth embodiment.

FIG. 28 is a diagram for explaining effects of the present embodiment and shows examples of a plurality of variations of album created in the present embodiment. To explain in detail, FIG. 28 shows a case where the albums 1 and 2 are created as albums for the objects A and B and the main object in the album 1 is set to the object A and the main object in the album 2 is set to the object B.

In the present embodiment, as regards the variations of album to be created, the total number of double-page spreads does not change depending on the album and is the same at all times. In the example in FIG. 28, the total number of double-page spreads is four irrespective of the album.

Further, the number of individual double-page spreads does not change depending on the album and is the same at all times. In the example in FIG. 28, the number of individual double-page spreads of the album 1 and the album 2 is one. In each album, the individual double-page spreads are not arranged in chronological order.

Further, the number of common double-page spreads does not change depending on the album and is the same at all times. In the example in FIG. 28, the number of common double-page spreads of the album 1 and the album 2 is three.

Further, as described above, the individual double-page spread is inserted at the position where the image capturing time difference between common double-page spreads is the maximum, and therefore, the position at which the individual page appears is the same in each album. For example, in FIG. 28, the individual page is arranged on the fourth double-page spread of the album.

According to the present embodiment, it is made possible to automatically make the same the number of double-page spreads and the position of the individual double-page spread of the album.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to create an album having both the contents common to all persons and the contents in accordance with each individual.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036905, filed Feb. 28, 2019, which is hereby incorporated by reference herein in its entirety.

What is claimed is:

1. An apparatus that receives an instruction for creating a plurality of albums respectively corresponding to a plurality of enhanced main objects, wherein each of the plurality of albums comprises a plurality of double page spreads including (a) a common double page spread used in common in the plurality of albums and (b) an individual double page spread corresponding to a target enhanced main object of the plurality of enhanced main objects, the apparatus comprising:

at least one processor causing the apparatus to act as a plurality of units comprising:

(1) a calculation unit configured to calculate (a) a first candidate number of individual double page spreads, based on a first number of acquired images and (b) a second candidate number of individual double page spreads, based on a second number of acquired images, the second number being different from the first number;

(2) a determination unit configured to determine a number of individual double page spreads that is set both in first album data for creating a first album and in second album data for creating a second album different from the first album, with the determined number being the smaller of the first candidate number and the second candidate number; and (3) a layout information output unit configured to create layout information for the first album and the second album, with the layout information indicating that a number of individual double-page spreads for both the first album and the second album corresponds to the determined number.

2. The apparatus according to claim 1, wherein a number of common double page spreads for the first album and the second album is determined by subtracting the number of individual double page spreads determined by the determination unit from a total number of double page spreads specified by a user.

3. The apparatus according to claim 1, wherein the first candidate number is 5 and the second candidate number is 2, and
wherein the determined number is 2.

4. The apparatus according to claim 1, wherein the determined number is 2,
wherein the individual double-page spreads for the first album are 2 in number and collectively include 5 images where a first object is a main object, and
wherein the individual double-page spreads for the second album are 2 in number and collectively include 3 images where a second object is a main object.

5. A method executed by at least one processor in an apparatus, the apparatus receiving an instruction for creating a plurality of albums respectively corresponding to a plurality of enhanced main objects, wherein each of the plurality of albums comprises a plurality of double page spreads including (a) a common double page spread used in common in the plurality of albums and (b) an individual double page spread corresponding to a target enhanced main object of the plurality of enhanced main objects, the method comprising:
a calculation step of calculating (a) a first candidate number of individual double page spreads, based on a first number of acquired images; and (b) a second candidate number of individual double page spreads, based on a second number of acquired images, the second number being different from the first number;
a determination step of determining a number of individual double page spreads that should be set both in first album data for creating a first album and in second album data for creating a second album different from the first album, with the determination being the smaller of the first number and the second number; and
a layout information creation step of creating layout information for the first album and the second album from the first album data, with the layout information indicating that a number of individual double-page spreads for both the first album and the second album corresponds to the determined number.

6. The method according to claim 5, wherein a number of common double page spreads for the first album and the second album is determined by subtracting the number of individual double page spreads determined at the determination step from a total number of double page spreads specified by a user.

7. A non-transitory computer-readable storage medium storing a program for causing a computer to function as an apparatus that receives an instruction for creating a plurality of albums respectively corresponding to a plurality of enhanced main objects, wherein each of the plurality of albums comprises a plurality of double page spreads including (a) a common double page spread used in common in the plurality of albums and (b) an individual double page spread corresponding to a target enhanced main object of the plurality of enhanced main objects, the apparatus comprising:
at least one processor causing the apparatus to act as a plurality of units comprising:
(1) a calculation unit configured to calculate (a) a first candidate number of individual double page spreads, based on a first number of acquired images and (b) a second candidate number of individual double page spreads, based on a second number of acquired images, the second number being different from the first number;
(2) a determination unit configured to determine a number of individual double page spreads that is set both in first album data for creating a first album and in second album data for creating a second album different from the first album, with the determined number being the smaller of the first candidate number and the second candidate number; and
(3) a layout information output unit configured to create layout information for the first album and the second album, with the layout information indicating that a number of individual double-page spreads for both the first album and the second album corresponds to the determined number.

* * * * *